US012627482B2

(12) United States Patent
Zhu et al.

(10) Patent No.: US 12,627,482 B2
(45) Date of Patent: May 12, 2026

(54) SECURE THREE-PARTY MULTIPLICATION METHOD AND SYSTEM FOR PRIVACY COMPUTING

(71) Applicant: BEIHANG UNIVERSITY, Beijing (CN)

(72) Inventors: Haogang Zhu, Beijing (CN); Shizhao Peng, Beijing (CN); Jiarui Tu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 153 days.

(21) Appl. No.: 18/377,201

(22) Filed: Oct. 5, 2023

(65) Prior Publication Data

US 2024/0340172 A1     Oct. 10, 2024

(30) Foreign Application Priority Data

Apr. 4, 2023    (CN) .......................... 202310348483.3

(51) Int. Cl.
H04L 9/08 (2006.01)

(52) U.S. Cl.
CPC ........ H04L 9/0861 (2013.01); H04L 2209/46 (2013.01)

(58) Field of Classification Search
CPC .......................... H04L 9/0861; H04L 2209/46
See application file for complete search history.

(56) References Cited

U.S. PATENT DOCUMENTS

| | | | | |
|---|---|---|---|---|
| 2018/0367293 A1* | 12/2018 | Chen | ......................... | H04L 9/30 |
| 2019/0089687 A1* | 3/2019 | Fiske | ..................... | H04L 9/304 |
| 2022/0078011 A1* | 3/2022 | Garcia Morchon | .. | H04L 9/3093 |
| 2022/0368518 A1* | 11/2022 | Lee | ....................... | H04L 9/0861 |
| 2023/0046000 A1* | 2/2023 | Tsuchida | ............... | G06F 21/552 |
| 2023/0224285 A1* | 7/2023 | Howe | ................... | H04L 9/0861 |
| | | | | 713/166 |
| 2023/0385446 A1* | 11/2023 | Liu | ......................... | H04L 9/008 |
| 2024/0129105 A1* | 4/2024 | Yanai | .................... | H04L 9/0861 |

* cited by examiner

*Primary Examiner* — Darshan I Dhruv
(74) *Attorney, Agent, or Firm* — Dickinson Wright PLLC

(57)     ABSTRACT

The present disclosure provides a secure three-party multiplication method and system for privacy computing, involving the technical field of privacy computing. The method includes that an auxiliary compute node generates three groups of random matrix pairs randomly and transmits the random matrix pairs to three parties, and the three parties compute respective sum matrixes based on a sum of respective random matrixes and private matrixes, respectively Â, Ĉ and B̂. A second party generates a matrix set according to a sum matrix, a first party obtains $T_a$ based on the matrix set and its own secret matrix, the second party obtains $T_b$ based on its own random secret matrix and $T_a$, and the third party generates its own random secret matrix based on $T_b$ and the matrix set, and obtains a product matrix according to three random secret matrixes. The present disclosure can improve reliability of result accuracy.

6 Claims, 6 Drawing Sheets

SECURE THREE-PARTY MULTIPLICATION METHOD AND SYSTEM FOR PRIVACY COMPUTING

CROSS REFERENCE TO RELATED APPLICATION

This patent application claims the benefit and priority of Chinese Patent Application No. 202310348483.3, filed with the China National Intellectual Property Administration on Apr. 4, 2023, the disclosure of which is incorporated by reference herein in its entirety as part of the present application.

TECHNICAL FIELD

The present disclosure relates to the technical field of privacy computing, and in particular, to a secure three-party multiplication method and system for privacy computing.

BACKGROUND

With the innovation and application of artificial intelligence and big data technologies, the world has officially entered the "data-driven" era, and data has become an important strategic resource for countries and enterprises. However, in the era of big data, it is necessary to achieve opening and sharing of data, and how to realize "availability but invisibility" of the data, to solve a problem of a data island to realize the interconnection and fusion analysis of the data becomes an urgent problem to be solved. A privacy computing technology not only realizes safe circulation of the data but also effectively ensures separation of data ownership and data use right on the premise that original data privacy is effectively guaranteed not to be disclosed.

The privacy computing technology is widely used in application scenarios such as joint mining of big data, and joint modeling of machine learning, which involve a large quantity of matrix multiplication computations. For example, a convolutional layer in a training neural network has a large quantity of high-dimensional security matrix product operations; in a support vector machine classification, computing a spacing distance involves a multiplication computation of a vector; in a K-Means clustering problem, computing a Euclidean distance also involves a large quantity of matrix multiplication computations; and in a linear regression problem, whether gradient optimization or least square is related to the matrix multiplication computations. The existing privacy computing scheme includes a homomorphic encryption-based scheme and a differential privacy-based scheme. Although the homomorphic encryption-based scheme has a strong mathematical complexity theory support in security guarantee, excessive pursuit of security and a large quantity of modulo operations are involved so that computation complexity thereof is high, a computation speed is slow, ciphertext computation difficulty is upgraded and depends on a large quantity of computation resources, and accuracy of a computation result is not reliable. The scheme based on a differential privacy technology has the advantage of being highly secure against attacks by malicious nodes on original data, but has the disadvantage that introduction of noise leads to low accuracy reliability of a final matrix computation result.

SUMMARY

The present disclosure aims to provide a secure three-party multiplication method and system for privacy computing, which can improve reliability of result accuracy.

To achieve the above objective, the present disclosure provides the following technical solutions.

A secure three-party multiplication method for privacy computing includes:

generating, by an auxiliary compute node, three groups of random matrix pairs randomly $(R_a, r_a)$ $(R_b, r_b)$ and $(R_c, r_c)$, sending the random matrix pair $(R_a, r_a)$ to a first participant, sending the random matrix pair $(R_b, r_b)$ to a second participant, and sending the random matrix pair $(R_c, r_c)$ to a third participant, wherein $r_a + r_b + r_c = R_a \cdot R_b \cdot R_c$;

computing, by the second participant, a sum of a random matrix $R_b$ and a private matrix B of the second participant to obtain a matrix $\hat{B}$, and determining whether the matrix $\hat{B}$ is a non-full rank matrix to obtain a first determining result;

if the first determining result is no, returning to the step of generating, by an auxiliary compute node, three groups of random matrix pairs randomly $(R_a, r_d)$ $(R_b, r_b)$ and $(R_e, r_c)$, sending the random matrix pair $(R_a, r_a)$ to a first participant, sending the random matrix pair $(R_b, r_b)$ to a second participant, and sending the random matrix pair $(R_c, r_c)$ to a third participant;

if the first determining result is yes, computing a matrix $\varphi_1$ according to a matrix and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, sending the matrix $\gamma_1$ and the matrix $\varphi_1$ to the third participant, and sending the matrix $\gamma_2$ and the matrix $\varphi_2$ to the first participant; wherein the matrix $\hat{A}$ is obtained by computing a sum of a random matrix $R_a$ and a private matrix A of the first participant by the first participant, and the matrix $\hat{C}$ is obtained by computing a sum of a random matrix $R_c$ and a private matrix C of the third participant by the third participant;

decomposing, by the second participant, the matrix $\hat{B}$ through a manner of full rank decomposition to obtain a column full rank matrix $B_1$ and a row full rank matrix $B^2$, wherein ranks of the matrix $\hat{B}$, the column full rank matrix $B_1$, and the row full rank matrix $B_2$ are equal, sending the column full rank matrix $B_1$ to the first participant, and sending the row full rank matrix $B_2$ to the third participant;

generating, by the first participant, a secret random matrix $V_a$ randomly, computing a matrix $T_a$ according to the matrix $\varphi_2$, the private matrix A of the first participant, the matrix $\gamma_2$, the random matrix $R_a$, the secret random matrix $V_a$ and a random matrix $r_a$ computing a matrix $t_1$ according to the random matrix $R_a$ and the column full rank matrix $B_1$, sending the matrix $T_a$ and the matrix $t_1$ to the second participant, and sending the secret random matrix $V_a$ to a three-party matrix multiplication computation requestor;

generating, by the second participant, a secret random matrix $V_b$ randomly, obtaining a matrix $T_b$ according to the matrix $T_a$, the matrix $\hat{A}$, the random matrix $R_a$ the matrix $\hat{C}$, the matrix $t_1$, a matrix $t_2$, the secret random matrix $V_b$, and a random matrix $r_b$, sending the matrix $T_b$ to the third participant, and sending the secret random matrix $V_b$ to the three-party matrix multiplication computation requestor; wherein the matrix $t_2$ is obtained by computing by the third participant according to the row full rank matrix $B_2$ and a random matrix $R_c$;

obtaining, by the third participant, a secret random matrix $V_c$ according to the matrix $T_b$, the matrix $\varphi_1$, the matrix $\gamma_1$, the random matrix $R_c$, and a random matrix $r_c$, and sending the secret random matrix $V_c$ to the three-party matrix multiplication computation requestor; and obtaining, by the three-party matrix multiplication computation requestor, a product matrix ABC according to the secret random matrix $V_a$, the secret random matrix $V_b$, and the secret random matrix $V_c$.

A secure three-party multiplication method for privacy computing includes:

generating, by an auxiliary compute node, three groups of random matrix pairs randomly $(R_a, r_a)$ $(R_b, r_b)$ and $(R_c, r_c)$, sending the random matrix pair $(R_a, r_a)$ to a first participant, sending the random matrix pair $(R_b, r_b)$ to a second participant, and sending the random matrix pair $(R_c, r_c)$ to a third participant, wherein $r_a + r_b + r_c = R_a \cdot R_b \cdot R_c$;

computing, by the second participant, a sum of a random matrix $R_b$ and a private matrix B of the second participant to obtain a matrix $\hat{B}$, computing a matrix $\varphi_1$ according to a matrix $\hat{A}$ and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, and sending the matrix $\gamma_1$ and the matrix $\varphi_1$ to the third participant, and sending the matrix $\gamma_2$ and the matrix $\varphi_2$ to the first participant; wherein the matrix $\hat{A}$ is obtained by computing a sum of a random matrix $R_a$ and a private matrix A of the first participant by the first participant, and the matrix $\hat{C}$ is obtained by computing a sum of a random matrix $R_c$ and a private matrix C of the third participant by the third participant;

decomposing, by the second participant, the matrix $\hat{B}$ through a manner of full rank decomposition to obtain a column full rank matrix $B_1$ and a row full rank matrix $B_2$, wherein ranks of the matrix $\hat{B}$, the column full rank matrix $B_1$, and the row full rank matrix $B_2$ are equal, sending the column full rank matrix $B_1$ to the first participant, and sending the row full rank matrix $B_2$ to the third participant;

generating, by the first participant, a secret random matrix $V_a$ randomly, and performing scheme 1 or scheme 2; wherein the scheme 1 comprises: computing a matrix $T_a$ according to the matrix $\varphi_2$, the private matrix A of the first participant, the matrix $\gamma_2$, the random matrix $R_a$, the secret random matrix $V_a$, and a random matrix $r_a$, computing a matrix $t_1$ according to the random matrix $R_a$ and the column full rank matrix $B_1$, sending the matrix $T_a$ to the second participant, sending the matrix $t_1$ to the third participant, and sending the secret random matrix $V_a$ to a three-party matrix multiplication computation requestor; the scheme 2 comprises: computing a matrix $T_a$ according to the matrix $\varphi_2$, the private matrix A of the first participant, the matrix $\gamma_2$, the random matrix $R_a$, the secret random matrix $V_a$ the column full rank matrix $B_1$, a matrix $t_2$ and the random matrix $r_a$, sending the matrix $T_a$ to the second participant, and sending the secret random matrix $V_a$ to the three-party matrix multiplication computation requestor; wherein the matrix $t_2$ is obtained by computing by the third participant according to the row full rank matrix $B_2$ and a random matrix $R_c$;

generating, by the second participant, a secret random matrix $V_b$ randomly, obtaining a matrix $T_b$ according to the matrix $T_a$, the matrix $\hat{A}$, the random matrix $R_b$, the matrix $\hat{C}$, the secret random matrix $V_b$, and a random matrix $r_b$, sending the matrix $T_b$ to the third participant, and sending the secret random matrix $V_b$ to the three-party matrix multiplication computation requestor;

if the first participant performs the scheme 1, obtaining, by the third participant, a secret random matrix $V_c$ according to the matrix $T_b$, the matrix $t_1$, the row full rank matrix $B_2$, the random matrix $R_c$, the matrix $\varphi_1$, the matrix $\gamma_1$, and a random matrix $r_c$, and sending the secret random matrix $V_c$ to the three-party matrix multiplication computation requestor; if the first participant performs the scheme 2, obtaining, by the third participant, a secret random matrix $V_c$ according to the matrix $T_b$, the random matrix $R_c$, the matrix $\varphi_1$, the matrix $\gamma_1$, and the random matrix $r_c$, and sending the secret random matrix $V_c$ to the three-party matrix multiplication computation requestor; and obtaining, by the three-party matrix multiplication computation requestor, a product matrix ABC according to the secret random matrix $V_a$, the secret random matrix $V_b$, and the secret random matrix $V_c$.

A secure three-party multiplication method for privacy computing includes:

generating, by an auxiliary compute node, three groups of random matrix pairs randomly $(R_a, r)$ $(R_b, r_b)$ and $(R_c, r_c)$, sending the random matrix pair $(R_a, r_a)$ to a first participant, sending the random matrix pair $(R_b, r_b)$ to a second participant, and sending the random matrix pair $(R_c, r_c)$ to a third participant, wherein $r_a + r_b + r_c = R_a \cdot R_b \cdot R_c$;

computing, by the second participant, a sum of a random matrix $R_b$ and a private matrix B of the second participant to obtain a matrix $\hat{B}$, and determining whether the matrix $\hat{B}$ is a non-full rank matrix to obtain a first determining result;

if the first determining result is no, returning to the step of generating, by an auxiliary compute node, three groups of random matrix pairs randomly $(R_a, r_a)$ $(R_b, r_b)$ and $(R_e, r_c)$ sending the random matrix pair $(R_a, r_a)$ to a first participant, sending the random matrix pair $(R_b, r_b)$ to a second participant, and sending the random matrix pair $(R_c, r_c)$ to a third participant;

if the first determining result is yes, computing a matrix $\varphi_1$ according to a matrix $\hat{A}$ and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, and performing a first scheme or a second scheme; wherein the first scheme comprises: sending the matrix $\gamma_1$ and the matrix $\varphi_1$ to the third participant, and sending the matrix $\hat{B}$, the matrix $\gamma_2$, and the matrix $\varphi_2$ to the first participant; the second scheme comprises: sending the matrix $\hat{B}$, the matrix $\gamma_1$, and the matrix $\varphi_1$ to the third participant, and sending the matrix $\gamma_2$ and the matrix $\varphi_2$ to the first participant; the matrix $\hat{A}$ is obtained by computing a sum of a random matrix $R_a$ and a private matrix A of the first participant by the first participant, and the matrix $\hat{C}$ is obtained by computing a sum of the random matrix $R_c$ and a private matrix C of the third participant by the third participant;

generating, by the first participant, a secret random matrix $V_a$ randomly, if the second participant performs the first scheme, computing, by the first participant, a matrix $T_a$ according to the matrix $\varphi_2$, the private matrix A of the first participant, the matrix $\gamma_2$, the random matrix $R_a$, the secret random matrix $V_a$, and a random matrix $r_a$, computing a matrix t according to the random matrix $R_a$ and the matrix $\hat{B}$, sending the matrix $T_a$ to the second participant, sending the matrix t to the third participant, and sending the secret random matrix $V_0$ to a three-party matrix multiplication computation requestor; if the second participant performs the second scheme, computing, by the first participant, a matrix $T_a$ according to the matrix $\varphi_2$, the private matrix A of the first participant, the matrix $\gamma_2$, the random matrix $R_a$, the secret random matrix $V_a$, the random matrix $r_a$, and the matrix t, sending the matrix $T_a$ to the second participant, and sending the secret random matrix $V_a$ to the three-party matrix multiplication computation requestor; wherein the matrix t is obtained by computing by the third participant according to the random matrix $R_c$ and the matrix $\hat{B}$;

generating, by the second participant, a secret random matrix $V_b$ randomly, obtaining a matrix $T_b$ according to the matrix $T_a$, the matrix $\hat{A}$, the random matrix $R_b$, the matrix $\hat{C}$, the secret random matrix $V_b$, and a random matrix $r_b$, sending the matrix $T_b$ to the third participant, and sending the secret random matrix $V_b$ to the three-party matrix multiplication computation requestor;

if the second participant performs the first scheme, obtaining, by the third participant, a secret random matrix $V_c$ according to the matrix $T_b$, the matrix t, the random matrix $R_c$, the matrix $\varphi_1$, the matrix $\gamma_1$, and the random matrix $r_c$, and sending the secret random matrix $V_c$ to the three-party matrix multiplication computation requestor; if the second participant performs the second scheme, obtaining, by the third participant, a secret random matrix $V_c$ according to the matrix $T_b$, the random matrix $R_c$, the matrix $\varphi_1$, the matrix $\gamma_1$, and a random matrix $r_c$, and sending the secret random matrix $V_c$ to the three-party matrix multiplication computation requestor; and obtaining, by the three-party matrix multiplication computation requestor, a product matrix ABC according to the secret random matrix $V_a$, the secret random matrix $V_b$, and the secret random matrix $V_c$.

A secure three-party multiplication system for privacy computing includes:

a random matrix pair generation module, used for an auxiliary compute node to: generate three groups of random matrix pairs randomly $(R_a, r_a)$ $(R_b, r_b)$ and $(R_c, r_c)$, send the random matrix pair $(R_a, r_a)$ to a first participant, send the random matrix pair $(R_b, r_b)$ to a second participant, and send the random matrix pair $(R_c, r_c)$ to a third participant, wherein $r_a + r_b + r_c = R_a \cdot R_b \cdot R_c$;

a determining module, used for the second participant to compute a sum of a random matrix $R_b$ and a private matrix B of the second participant to obtain a matrix $\hat{B}$, and determine whether the matrix $\hat{B}$ is a non-full rank matrix to obtain a first determining result;

a first result module, configured to perform the random matrix pair generation module if the first determining result is no;

a second result module, configured to: if the first determining result is yes, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, send the matrix $\gamma_1$ and the matrix $\varphi_1$ to the third participant, and send the matrix $\gamma_2$ and the matrix $\varphi_2$ to the first participant; wherein the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant;

a decomposition module, used for the second participant to: decompose the matrix $\hat{B}$ through a manner of full rank decomposition to obtain a column full rank matrix $B_1$ and a row full rank matrix $B_2$, wherein ranks of the matrix $\hat{B}$, the column full rank matrix $B_1$, and the row full rank matrix $B_2$ are equal, send the column full rank matrix $B_1$ to the first participant, and send the row full rank matrix $B_2$ to the third participant;

a secret random matrix $V_a$ determining module, used for the first participant to: generate a secret random matrix $V_a$ randomly, compute a matrix $T_a$ according to the matrix $\varphi_2$, a private matrix A of the first participant, the matrix $\gamma_2$, the random matrix $R_a$, the secret random matrix $V_a$ and the random matrix $r_a$, compute a matrix $t_1$ according to the random matrix $R_a$ and the column full rank matrix $B_1$, send the matrix $T_a$ and the matrix $t_1$ to the second participant, and send the secret random matrix $V_a$ to a three-party matrix multiplication computation requestor;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_a$ the matrix $\hat{C}$, the matrix $t_1$, a matrix $t_2$, the secret random matrix $V_b$, and the random matrix $r_b$, send the matrix $T_b$ to the third participant, and send the secret random matrix $V_b$ to the three-party matrix multiplication computation requestor; wherein the matrix $t_2$ is obtained by computing by the third participant according to the row full rank matrix $B_2$ and the matrix $R_c$;

a secret random matrix $V_c$ determining module, used for the third participant to: obtain a secret random matrix $V_c$ according to the matrix $T_b$, the matrix $\varphi_1$, the matrix $\gamma_1$, the random matrix $R_c$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

A secure three-party multiplication system for privacy computing includes:

a random matrix pair generation module, used for an auxiliary compute node to: generate three groups of random matrix pairs randomly $(R_a, r_a)$ $(R_b, r_b)$ and $(R_c, r_c)$ send the random matrix pair $(R_a, r_a)$ to a first participant, send the random matrix pair $(R_b, r_b)$ to a second participant, and send the random matrix pair $(R_c, r_c)$ to a third participant, wherein $r_a + r_b + r_c = R_a \cdot R_b \cdot R_c$;

a matrix set computation module, used for the second participant to: compute a sum of a random matrix $R_b$ and a private matrix B of the second participant to obtain a matrix $\hat{B}$, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, send the matrix $\gamma_1$ and the matrix $\varphi_1$ to the third participant, and send the matrix $\gamma_2$ and the matrix $\varphi_2$ to the first participant; wherein the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant;

a decomposition module, used for the second participant to: decompose the matrix $\hat{B}$ through a manner of full rank decomposition to obtain a column full rank matrix $B_1$ and a row full rank matrix $B_2$, wherein ranks of the matrix $\hat{B}$, the column full rank matrix $B_1$, and the row full rank matrix $B_2$ are equal, send the column full rank matrix $B_1$ to the first participant, and send the row full rank matrix $B_2$ to the third participant;

a secret random matrix $V_a$ determining module, used for the first participant to: generate a secret random matrix $V_a$ randomly, and perform scheme 1 or scheme 2; in the scheme 1, compute a matrix $T_a$ according to the matrix $\varphi_2$, the private matrix A of the first participant, the matrix $\gamma_2$, the random matrix $R_a$, the secret random matrix $V_a$, and the random matrix $r_a$ compute a matrix $t_1$ according to the random matrix $R_a$ and the column full rank matrix $B_1$, send the matrix $T_a$ to the second participant, send the matrix $t_1$ to the third participant, and send the secret random matrix $V_a$ to a three-party matrix multiplication computation requestor; and in the scheme 2, compute a matrix $T_a$ according to the matrix $\varphi_2$, the private matrix A of the first participant, the matrix $\gamma_2$, the random matrix $R_a$, the secret random matrix $V_a$, the column full rank matrix $B_1$, a matrix $t_2$ and the random matrix $r_a$, send the matrix $T_a$ to the second participant, and send the secret random matrix $V_a$ to the three-party matrix multiplication computation requestor; wherein the matrix $t_2$ is obtained by computing by the third participant according to the row full rank matrix $B_Z$ and the random matrix $R_c$;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_b$, the matrix $\hat{C}$, the secret random matrix $V_b$, and the random matrix $r_b$, send the matrix $T_b$ to the third participant, and send the secret random matrix $V_b$ to the three-party matrix multiplication computation requestor;

a secret random matrix $V_c$ determining module, if the first participant performs scheme 1, used for the third participant to: obtain a secret random matrix $V_c$ according to the matrix $T_b$, the matrix $t_1$, the row full rank matrix $B_2$, the random matrix $R_c$, the matrix $\varphi_1$, the matrix $\gamma_1$, and the random matrix $r_c$, and send the secret random matrix $V_c$ to the three-party matrix multiplication computation requestor; and if the first participant performs scheme 2, used for the third participant to obtain a secret random matrix $V_c$ according to the matrix $T_b$, the random matrix $R_c$, the matrix $\varphi_1$, the matrix $\gamma_1$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

A secure three-party multiplication system for privacy computing includes:

a random matrix pair generation module, used for an auxiliary compute node to: generate three groups of random matrix pairs randomly $(R_a, r_a)$ $(R_b, r_b)$ and $(R_c,$ $r_c)$, send the random matrix pair $(R_a, r_a)$ to a first participant, send the random matrix pair $(R_b, r_b)$ to a second participant, and send the random matrix pair $(R_c, r_c)$ to a third participant, wherein $r+r_b+r_c=R_a \cdot R_b \cdot R_c$;

a determining module, used for the second participant to compute a sum of a random matrix $R_b$ and a private matrix B of the second participant to obtain a matrix $\hat{B}$, and determine whether the matrix $\hat{B}$ is a non-full rank matrix to obtain a first determining result;

a first result module, configured to perform the random matrix pair generation module if the first determining result is no;

a second result module, configured to: if the first determining result is yes, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, and perform a first scheme or a second scheme; in the first scheme, send the matrix $\gamma_1$ and the matrix $\varphi_1$ to the third participant, and send the matrix $\hat{B}$, the matrix $\gamma_2$, and the matrix $\varphi_2$ to the first participant; and in the second scheme, send the matrix $\hat{B}$, the matrix $\gamma_1$, and the matrix $\varphi_1$ to the third participant, and send the matrix $\gamma_2$ and the matrix $\varphi_2$ to the first participant; wherein the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant;

a secret random matrix $V_a$ determining module, used for the first participant to generate a secret random matrix $V_a$ randomly, wherein if the second participant performs the first scheme, the first participant computes a matrix $T_a$ according to the matrix $\varphi_2$, the private matrix A of the first participant, the matrix $\gamma_2$, the random matrix $R_a$, the secret random matrix $V_a$, and the random matrix $r_a$, computes a matrix t according to the random matrix $R_a$ and the matrix $\hat{B}$, sends the matrix $T_a$ to the second participant, sends the matrix t to the third participant, and sends the secret random matrix $V_a$ to a three-party matrix multiplication computation requestor; if the second participant performs the second scheme, the first participant computes a matrix $T_a$ according to the matrix $\varphi_2$, the private matrix A of the first participant, the matrix $\gamma_2$, the random matrix $R_a$, the secret random matrix $V_a$, the random matrix $r_a$, and a matrix t, sends the matrix $T_a$ to the second participant, and sends the secret random matrix $V_a$ to the three-party matrix multiplication computation requestor; and the matrix t is obtained by computing by the third participant according to the random matrix $R_c$ and the matrix $\hat{B}$;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_b$, the matrix $\hat{C}$, the secret random matrix $V_b$, and the random matrix $r_b$, send the matrix $T_b$ to the third participant, and send the secret random matrix $V_b$ to the three-party matrix multiplication computation requestor;

a secret random matrix $V_c$ determining module, if the second participant performs the first scheme, used for the third participant to: obtain a secret random matrix $V_c$ according to the matrix $T_b$, the matrix t, the random matrix $R_c$, the matrix $\varphi_1$, the matrix $\gamma_1$, and the random matrix $r_c$, and send the secret random matrix $V_c$ to the three-party matrix multiplication computation requestor; and if the second participant performs the second scheme, used for the third participant to obtain a secret random matrix $V_c$ according to the matrix $T_b$, the random matrix $R_c$, the matrix $\varphi_1$, the matrix $\gamma_1$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

According to a specific embodiment provided by the present disclosure, the present disclosure discloses the following technical effect: The present disclosure mixes up $R_a$ and A, $R_c$ and C, and $R_b$ and B by addition, and computation methods of linear algebra are all adopted in a computation process, instead of a modulo operation, so as to improve the reliability of the result accuracy.

BRIEF DESCRIPTION OF THE DRAWINGS

To describe technical solutions in embodiments of the present disclosure or in the conventional technology more clearly, the following briefly describes accompanying drawings required for describing embodiments. Apparently, the accompanying drawings in the following description merely show some embodiments of the present disclosure, and a person of ordinary skill in the art may still derive other drawings from these accompanying drawings without creative efforts.

DETAILED DESCRIPTION OF THE EMBODIMENTS

The following clearly and fully describes technical solutions in embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the foregoing objectives, features, and advantages of the present disclosure clearer and more comprehensible, the present disclosure will be further described in detail below with reference to the accompanying drawings and specific implementations.

Figure 1:
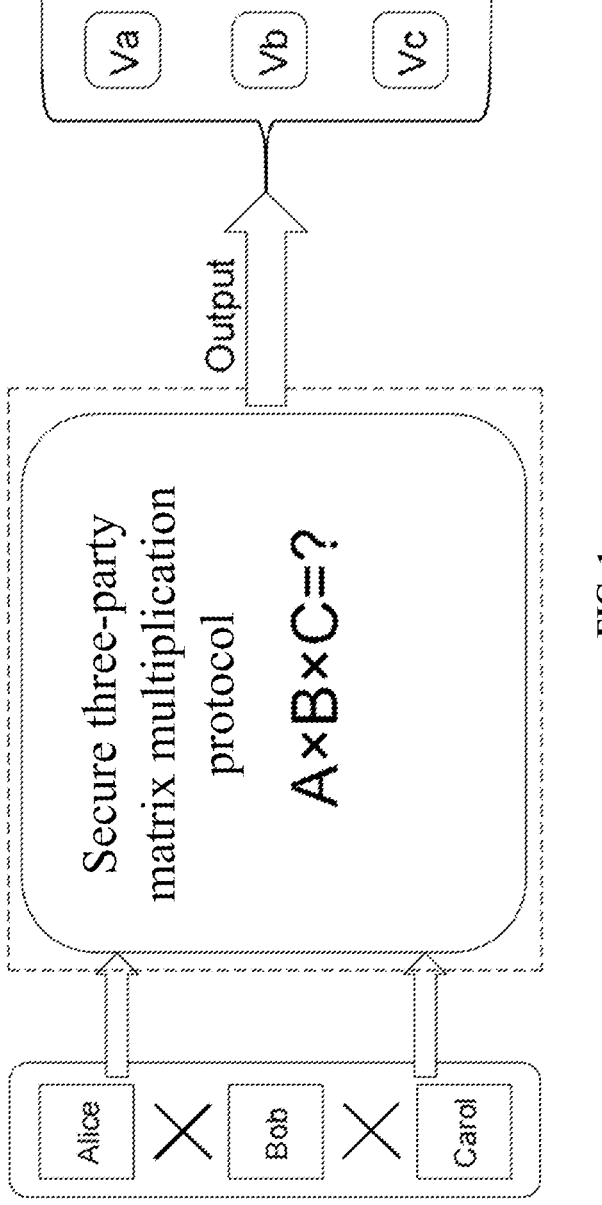
FIG. 1 is a schematic diagram of a secure three-party matrix multiplication problem.
Figure 2:
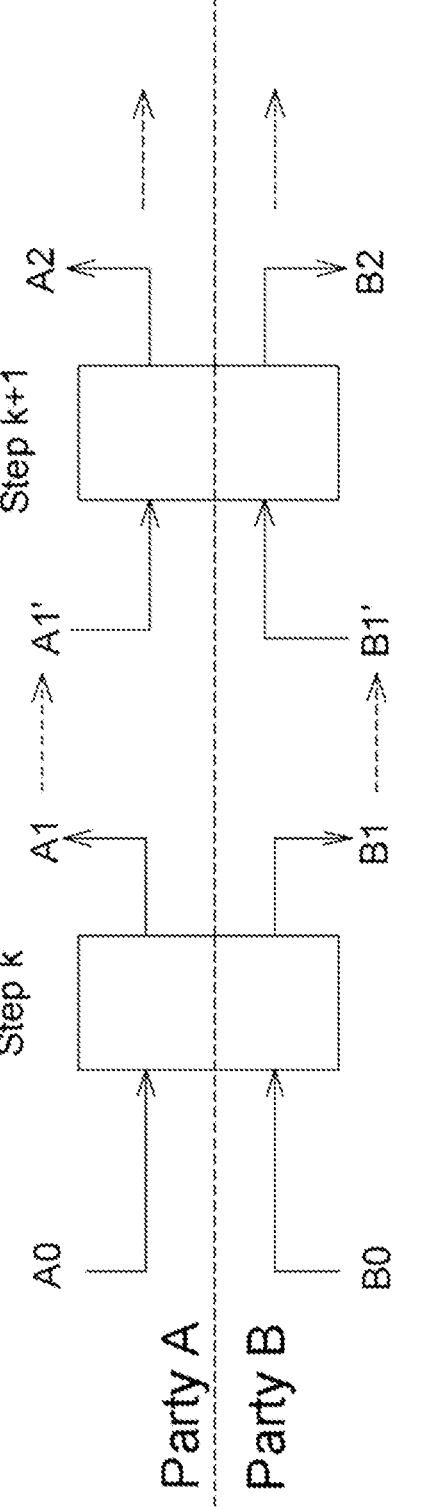
FIG. 2 is a schematic diagram of a data obfuscation technical solution according to an embodiment of the present disclosure.

In the present disclosure, it is known that there are three computation parties Alice, Bob, Carol, independent of each other and not trusted to each other, Alice holds a private data matrix A which has a dimension of n×s and is only stored at its own compute node, Bob holds a private data matrix B which has a dimension of s×t, and Carol holds a private data matrix C which has a dimension of t×m. Three participants perform a three-party matrix multiplication protocol computation $f(A,B,C)=ABC=V_a+V_b+V_c$, finally respective corresponding dimensions obtained by each computation participant node are an output matrix $V_a$, $V_b$, $V_c$ of n×m, and the output matrix $V_a$, $V_b$, $V_c$ is sent to a computation requestor to aggregate to obtain a desired three-party matrix product result. During a computational process, each participant node can only know its own input/output information, and cannot obtain an intermediate settlement result and holding data information of another participant. As shown in FIG. 1, for most multi-party computations, there is usually more than one step in the process of implementing a secure computation. How to ensure safety of intermediate results is an inevitable problem. For example, when a product a×b of two-party matrixes is used as an intermediate result of the computation, whether the participant node Alice or the node Bob obtains a result of a final matrix a×b, it is possible to reversely deduce data information of another party. Therefore, not only safety of an original data input but also safety of an intermediate value should be ensured during a privacy computing process. In order to solve this problem, a data obfuscation encryption technique is proposed, in which an arbitrary multi-item operation is disassembled into a new multi-item addition method for obfuscating and computing a result of an intermediate value. To illustrate its principle more easily, a basic two-party operation type is exemplified herein, and its principle is shown in FIG. 2. If $S_k=F_k(A_i, B_i)$, $F_k$ is a target computation function, $A_i$ is private data belonging to the organization Alice, and $B_i$ is private data belonging to the organization Bob. When each step of a secure multi-party computation protocol is performed, the intermediate result $S_k$ strictly follows the following constraint: Alice knows only a computation result $A_k$ belonging to itself, Bob knows only $B_k$, and $A_k+B_k=S_k$. A formula $[A_i:B_i]\Rightarrow[A_k:B_k|A_k+B_k=F_k(A_i,B_i)]$ represents a transfer process of the intermediate value, during which Alice and Bob are not allowed to exchange each other's data information, including split $A_k$ and $B_k$ of computing the intermediate result. As long as it is ensured that the intermediate value is divided into two pieces of random data items at each step during a computation, it is possible to ensure that no one can reversely deduce an original data item from obfuscated and encrypted data, so that a whole process of privacy computing has high safety. Based on this, the present disclosure provides a plurality of secure three-party multiplication methods and systems for privacy computing.

Embodiment 1: The secure three-party multiplication method for privacy computing provided in this embodiment includes:

An auxiliary compute node, also referred to as a commodity server node CS (Commodity Server), randomly generates three groups of random matrix pairs $(R_a, r_a)$ $(R_b, r_b)$ and $(R_c, r_c)$, sends the random matrixes pair $(R_a, r_a)$ to a first participant (an Alice compute node), sends the random matrix pair $(R_b, r_b)$ to a second participant (a Bob compute node), and sends the random matrix pair $(R_c, r_c)$ to a third participant (a Carol compute node); where $r_a+r_b+r_c=R_a \cdot R_b \cdot R_c$. A dimension of $R_a$ is n×s, a dimension of $R_b$ is s×t, a dimension of $R_c$ is t×m, and a dimension of $r_a$, $r_b$, $r_c$ is n×m. When a whole computation protocol is performed, the CS auxiliary node needs to strictly meet the following three requirements: (1) Not contact private data information related to three participants, whether an input or output result of an intermediate computation process. (2) Not conspire with any participant compute node. (3) Strictly follow a protocol process to correctly perform an assigned subtask. The CS auxiliary node does not directly participate in a subsequently actual computation process of the secure three-party multiplication computation, only provides a random matrix pair that matches dimensions of private data A, B, and C, and is independent of each other at an initial phase for performing a protocol, thereby protecting information of a private matrix of a participant and ensuring safety of original data in a subsequent computation process.

The second participant computes a sum of a random matrix $R_b$ and a private matrix B of the second participant to obtain a matrix $\hat{B}$, and determines whether the matrix $\hat{B}$ is a non-full rank matrix to obtain a first determining result.

If the first determining result is no, return to a step in which an auxiliary compute node generates three groups of random matrix pairs randomly $(R_a, r_a)$ $(R_b, r_b)$ and $(R_c, r_c)$, sends the random matrix pair $(R_a, r_a)$ to the first participant, sends the random matrix pair $(R_b, r_b)$ to the second participant, and sends the random matrix pair $(R_c, r_c)$ to the third participant.

If the first determining result is yes, a matrix $\varphi_1$ is computed according to a matrix A and the matrix $\hat{B}$, a matrix $\gamma_1$ is computed according to the matrix and the random matrix $R_b$, a matrix $\varphi_2$ is computed according to the matrix $\hat{B}$ and a matrix $\hat{C}$, a matrix $\gamma_2$ is computed according to the random matrix $R_b$ and the matrix $\hat{C}$, the matrix $\gamma_1$ and the matrix $\varphi_1$ are sent to the third participant, and the matrix $\gamma_2$ and the matrix $\varphi_2$ are sent to the first participant; where the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant.

The second participant decomposes the matrix $\hat{B}$ through a manner of full rank decomposition to obtain a column full rank matrix $B_1$ and a row full rank matrix $B_2$, where ranks of the matrix $\hat{B}$, the column full rank matrix $B_1$, and the row full rank matrix are equal, sends the column full rank matrix $B_1$ to the first participant, and sends the row full rank matrix $B_2$ to the third participant.

The first participant generates a secret random matrix $V_a$ randomly, a matrix $T_a$ is computed according to the matrix $\varphi_2$, a private matrix A of the first participant, the matrix $\gamma_2$, the random matrix $R_a$, the secret random matrix $V_a$ and the random matrix $r_a$, a matrix $t_1$ is computed according to the random matrix $R_a$ and the column full rank matrix $B_1$, the matrix $T_a$ and the matrix $t_1$ are sent to the second participant, and the secret random matrix $V_a$ is sent to a three-party matrix multiplication computation requestor.

The second participant generates a secret random matrix $V_b$ randomly, obtains a matrix $T_b$ according to the matrix $T_a$, the matrix $\hat{A}$, the random matrix $R_a$, the matrix $\hat{C}$, the matrix $t_1$, a matrix $t_2$, the secret random matrix $V_b$, and the random matrix $r_b$, sends the matrix $T_b$ to the third participant, and sends the secret random matrix $V_b$ to the three-party matrix multiplication computation requestor. The matrix $t_2$ is obtained by computing by the third participant according to the row full rank matrix $B_2$ and the matrix $R_c$.

The third participant obtains a secret random matrix $V_c$ according to the matrix $T_b$, the matrix $\varphi_1$, the matrix $\gamma_1$, the random matrix $R_c$, and the random matrix $r_c$, and sends the secret random matrix $V_c$ to the three-party matrix multiplication computation requestor.

The three-party matrix multiplication computation requestor obtains a product matrix ABC according to the secret random matrix $V_a$, the secret random matrix $V_b$, and the secret random matrix $V_c$.

In actual application, after the obtaining, by the three-party matrix multiplication computation requestor, a product matrix ABC according to the secret random matrix $V_a$, the secret random matrix $V_b$, and the secret random matrix $V_c$, the method further includes:

The three-party matrix multiplication computation requestor determines whether the product matrix ABC is reliable according to a self-checking matrix $C_a$, a self-checking matrix $C_b$, a self-checking matrix $C_c$ and a self-checking key Ckey, if not, returns to a step in which an auxiliary compute node generates three groups of random matrix pairs randomly $(R_a, r_a)$ $(R_b, r_b)$ and $(R_c, r_c)$, sends the random matrix pair $(R_a, r_a)$ to the first participant, sends the random matrix pair $(R_b, r_b)$ to the second participant, and sends the random matrix pair $(R_c, r_c)$ to the third participant, and if yes, ends computing. The auxiliary compute node obtains the self-checking key Ckey according to the random matrix $r_a$, the random matrix $r_b$, and the random matrix $r_c$. The first participant obtains $C_a$ according to $\varphi_2$, A, $\gamma_2$, $R_a$, and $V_a$; the second participant obtains $C_b$ according to $\hat{A}$, $R_b$, $\hat{C}$, $t_1$, $t_2$ and $V_b$; and the third participant obtains $C_c$ according to $\varphi_1$, $R_c$, $\gamma_1$, and $V_c$.

In actual application, matrix decomposition is not limited to full rank decomposition, and a scheme of feature decomposition, singular value decomposition, LU decomposition, or QR decomposition can also be used.

Figure 4:
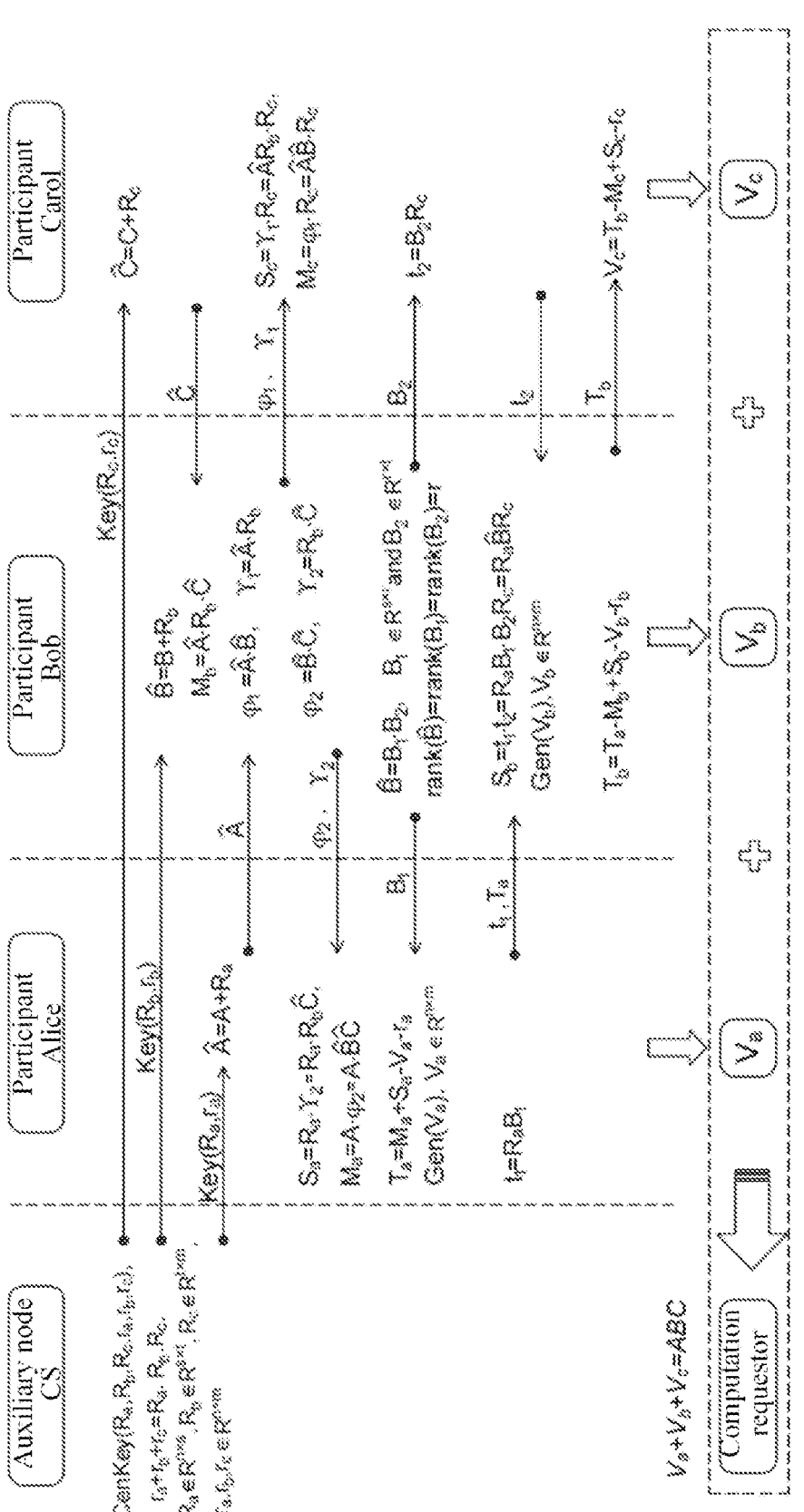
FIG. 4 is a flowchart of a scheme according to Embodiment 2 of the present disclosure.

Embodiment 2: As shown in FIG. 4, the present disclosure further provides a more specific embodiment for describing Embodiment 1 in detail:

Step 1: Three groups of random matrix pairs are generated by the auxiliary compute node and assigned to three participants.

Step 2: After receiving a corresponding random matrix pair $(R_a, r_a)$ Alice computes $\hat{A}=A+R_a$ and sends it to Bob.

Step 3: After receiving a corresponding random matrix pair $(R_c, r_c)$ Carol computes $\hat{C}=C+R_c$ and sends it to Bob.

Step 4: After receiving a corresponding random matrix pair $(R_b, r_b)$, Bob computes $\hat{B}=B+R_b$ and synchronously verifies whether a matrix $\hat{B}$ is a non-full rank matrix, if not, returns to step 1, if yes, continues to compute and send $\varphi_1=\hat{A}\cdot\hat{B}$ and $\gamma_1=\hat{A}\cdot R_b$ to carol, and send $\varphi_2=\hat{B}\cdot\hat{C}$ and $\gamma_2=R_b\cdot\hat{C}$ to Alice.

Step 5: After receiving the matrix $\varphi_2$, $\gamma_2$ sent from Bob, Alice successively computes $S_a=R_a\cdot\gamma_2=R_a\cdot R_b\hat{C}$ and $M_a=A\cdot\varphi_2=A\cdot\hat{B}\cdot\hat{C}$ locally.

Step 6: After receiving the matrix $\varphi_1$, $\gamma_1$ sent from Bob, Carol successively computes $S_c=\gamma_1\cdot R_c=\hat{A}R_b\cdot R_c$ and $M_c=\varphi_1\cdot R_c=\hat{A}\cdot\hat{B}\cdot R_c$ locally.

Step 7: Bob internally uses a manner of full rank decomposition to split the matrix $\hat{B}$, to obtain a column full rank matrix $B_1\in R^{s\times r}$ and a row full rank matrix $B_2\in R^{r\times t}$, sends $B_1$ to Alice, and sends $B_2$ to Carol.

Step 8: After receiving the matrix $B_1$ from Bob, Alice internally generates a random matrix of $V_a\in R^{n\times m}$ secretly, computes locally $T_a=M_a+S_a-V_a-r_a$ and $t_1=R_aB_1$, and sends $T_a$ and $t_1$ to Bob.

Step 9: After receiving the matrix $B_2$ from Bob, Carol secretly computes $t_2=B_2R_c$, and sends a result $t_2$ to Bob.

Step 10: After receiving the matrix $T_a$ and $t_1$ sent from Alice and the matrix $t_2$ sent from Carol, Bob internally generates a random matrix $V_b \in R^{n \times m}$ secretly, and secretly computes the matrix $M_b = \hat{A} \cdot R_b \cdot \hat{C}$ and $S_b = t_1 \cdot t_2 = R_a B_1 \cdot B_2 R_c = R_a \hat{B} R_c$ locally, and finally obtains $T_b = T_a - M_b + S_b - V_b - r_b$ which is sent to Carol.

Step 11: After receiving $T_b$, Carol secretly computes and obtains a matrix $V_c = T_b - M_c + S_c - r_c$ locally.

Step 12: Final obfuscation split results $V_a$, $V_b$ and $V_c$ respectively corresponding to three parties are sent to a three-party matrix multiplication computation requestor, and are aggregated by the three-party matrix multiplication computation requestor to obtain a final product $ABC = V_a + V_b + V_c$.

Step 13: The CS auxiliary node sums random matrixes $r_a$, $r_b$, $r_c$ that are initially generated, and the sum of $r_a$, $r_b$, $r_c$ is used as a reliability self-checking key Ckey of secure three-party matrix multiplication, where $r_a + r_b + r_c = R_a \cdot R_b \cdot R_c = Ckey$, and sends Ckey to the computation requestor.

Step 14: The Alice node secretly computes $C_a = M_a + S_a - V_a$ locally according to private computation intermediate term matrixes $M_a$, $S_a$, $V_a$ held by the Alice node, and sends the self-checking matrix $C_a$ to the computation requestor.

Step 15: The Bob node secretly computes $C_b = -M_b + S_b - V_b$ locally according to private computation intermediate term matrixes $M_b$, $S_b$, $V_b$ held by the Bob node, and sends the self-checking matrix $C_b$ to the computation requestor.

Step 16: The Carol node secretly computes $C_c = -M_c + S_c - V_c$ locally according to private computation intermediate term matrixes $M_c$, $S_c$, $V_c$ held by the Carol node, and sends the self-checking matrix C to the computation requestor.

Step 17: The computation requestor sums obtained self-checking matrixes $C_a$, $C_b$, $C_c$ to obtain an experimental result $C_P$ after a single computation, and then determines whether the experimental result $C_P$ is consistent with the self-checking key Ckey. If yes, it indicates that the computation is correct; and if not, it indicates that an error occurs in the computation result and the computation is not reliable. A new round of secure three-party matrix multiplication protocol is performed.

Embodiment 3: This embodiment differs from the foregoing Embodiment 1. After computing a sum of a random matrix $R_b$ and a private matrix B of a second participant to obtain a matrix $\hat{B}$, the second participant in this embodiment does not perform non-full rank judgment, but directly computes a matrix $\varphi_1$, a matrix $\gamma_1$, a matrix $\varphi_2$, a matrix $\gamma_2$, a column full rank matrix $B_1$ and a row full rank matrix $B_2$, sends the row full rank matrix $B_2$, the matrix $\gamma_1$ and the matrix $\varphi_1$ to a third participant, and sends the column full rank matrix $B_1$, the matrix $\gamma_2$ and the matrix $\varphi_2$ to a first participant. The first participant randomly generates a secret random matrix $V_a$ and performs scheme 1 or scheme 2. In the scheme 1, a matrix $T_a$ is computed according to the matrix $\varphi_2$, a private matrix A of the first participant, the matrix $\gamma_2$, a random matrix $R_a$, the secret random matrix $V_a$ and a random matrix $r_a$, a matrix $t_1$ is computed according to the random matrix $R_a$ and the column full rank matrix $B_1$, the matrix $T_a$ is sent to the second participant, the matrix $t_1$ is sent to the third participant, and the secret random matrix $V_a$ is sent to a three-party matrix multiplication computation requestor. In the scheme 2, the matrix $T_a$ is computed according to the matrix $\varphi_2$, the private matrix A of the first participant, the matrix $\gamma_2$, the random matrix $R_a$, the secret random matrix $V_a$, the column full rank matrix $B_1$, the matrix $t_2$ and the random matrix $r_a$, the matrix $T_a$ is sent to the second participant, the secret random matrix $V_a$ is sent to the three-party matrix multiplication computation requestor. A matrix $t_2$ is obtained by computing by the third participant according to the row full rank matrix $B_2$ and a random matrix $R_c$. The second participant randomly generates a secret random matrix $V_b$, obtains a matrix $T_b$ according to the matrix $T_a$ a matrix $\hat{A}$, a random matrix $R_b$, a matrix $\hat{C}$, a secret random matrix $V_b$ and a random matrix $r_b$, sends the matrix $T_b$ to the third participant, and sends the secret random matrix $V_b$ to the three-party matrix multiplication computation requestor. If the first participant performs the scheme 1, the third participant obtains a secret random matrix $V_c$ according to the matrix $T_b$, the matrix $t_1$, the row full rank matrix $B_2$, a random matrix $R_c$, the matrix $\varphi_1$, the matrix $\gamma_1$ and a random matrix $r_c$, and sends the secret random matrix $V_c$ to the three-party matrix multiplication computation requestor. If the first participant performs the scheme 2, the third participant obtains the secret random matrix $V_c$ according to the matrix $T_b$, the random matrix $R_c$, the matrix $\varphi_1$, the matrix $\gamma_1$ and the random matrix $r_c$, and sends the secret random matrix $V_c$ to the three-party matrix multiplication computation requestor. The three-party matrix multiplication computation requestor obtains a product matrix ABC according to the secret random matrix $V_a$, the secret random matrix $V_b$ and the secret random matrix $V_c$. If the first participant performs the scheme 1, the first participant obtains $C_a$ according to $\varphi_2$, A, $\gamma_2$ $R_b$ and $V_a$; the second participant obtains $C_b$ according to $\hat{A}$, $R_a$, $\hat{C}$ and $V_b$; the third participant obtains $C_c$ according to $\varphi_1$, $R_c$, $\gamma_1$, $t_1$, $B_2$ and $V_c$. If the first participant performs the scheme 2, the first participant obtains $C_a$ according to $\varphi_2$, A, $\gamma^2$, $R_b$, $V_a$, $B_1$, $R_a$ and $t_2$; the second participant obtains $C_b$ according to $\hat{A}$, $R_a$, $\hat{C}$ and $V_b$; the third participant obtains $C_c$ according to $\varphi_1$, $R_c$, $\gamma_1$ and $V_c$.

Figure 5:
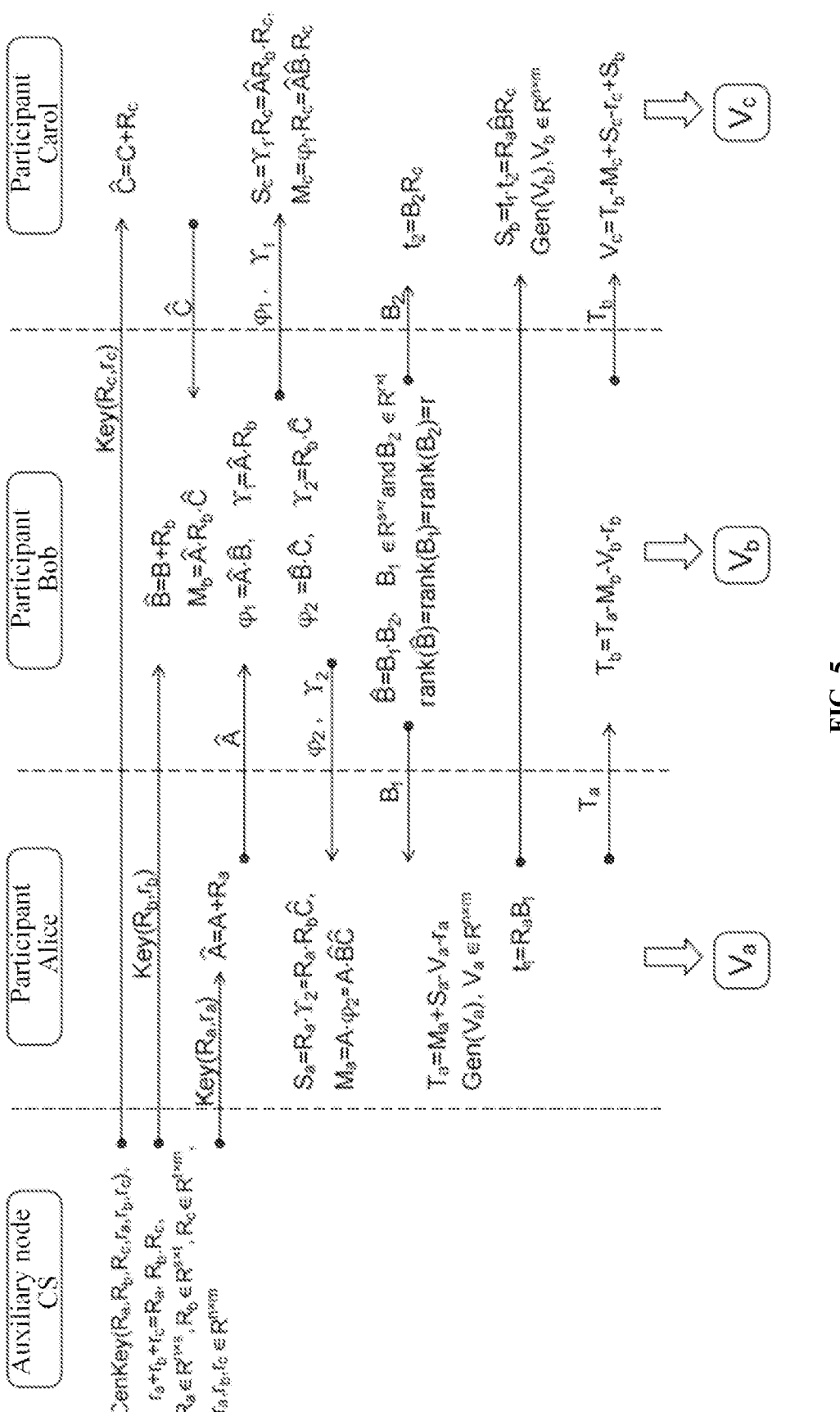
FIG. 5 is a flowchart of a scheme according to Embodiment 4 of the present disclosure.

Embodiment 4: As shown in FIG. 5, the present disclosure further provides a more specific embodiment for describing Embodiment 3 in detail:

Steps 1 to 3 in this embodiment are the same as steps 1 to 3 in Embodiment 2.

Step 4: After receiving a corresponding random matrix pair $(R_b, r_b)$ Bob computes $\hat{B} = B + R_b$, sends $\varphi_1 = \hat{A} \cdot \hat{B}$ and $\gamma_1 = \hat{A} \cdot R_b$ to carol, and sends $\varphi_2 = \hat{B} \cdot \hat{C}$ and $\gamma_2 = R_b \cdot \hat{C}$ to Alice.

Steps 5 to 7 in this embodiment are the same as steps 5 to 7 in Embodiment 2.

Step 8: After receiving the matrix B, from Bob, Alice internally generates a random matrix of $V_a \in R^{n \times m}$ secretly, computes locally $T_a = M_a + S_a - V_a - r_a$ and $t_1 = R_a B_1$, sends $T_a$ to Bob, and sends $t_1$ to Carol.

Step 9: After receiving the matrix $B_2$ from the Bob node, the Carol node secretly computes $t_2 = B_2 R_c$.

Step 10: After receiving the matrix $T_a$ sent from the Alice node, the Bob node internally generates a random matrix $V_b \in R^{n \times m}$ secretly, secretly computes a matrix $M_b = \hat{A} \cdot R_b \cdot \hat{C}$ locally, and finally obtains $T_b = T_a - M_b - V_b - r_b$ which is sent to Carol.

Step 11: After receiving the matrix $t_1$ sent from Alice and the matrix $T_b$ sent from Bob, Carol secretly computes $S_b = t_1 \cdot t_2 = R_a B_1 \cdot B_2 R_c = R_a \hat{B} R_c$ and the matrix $V_c = T_b + S_b - M_c + S_c - r_c$ locally.

Step 12 and step 13 in this embodiment are the same as step 12 and step 13 in Embodiment 2.

Step 14: The Alice node secretly computes $C_a = M_a + S_a - V_a$ locally according to private computation intermediate term matrixes $M_a$, $S_a$, $V_a$ held by the Alice node, and sends a self-checking matrix $C_a$ to the computation requestor.

Step 15: The Bob node secretly computes $C_b=-M_b-V_b$ locally according to private computation intermediate term matrixes $M_b$ and $V_b$ held by the Bob node, and sends a self-checking matrix $C_b$ to the computation requestor.

Step 16: The Carol node secretly computes $C_c=-M_c+S_c-V_c+S_b$ locally according to private computation intermediate term matrixes $M_c$, $S_c$, $V_c$ and $S_b$ held by the Carol node, and sends a self-checking matrix C to the computation requestor.

Step 17 in this embodiment is the same as step 17 in Embodiment 2.

Embodiment 5: The present disclosure further provides a more specific embodiment for describing Embodiment 3 in detail:

Steps 1 to 7 in this embodiment are the same as steps 1 to 7 in Embodiment 4.

Step 8: After receiving the matrix $B_2$ from the Bob node, the Carol node secretly computes $t_2=B_2R_c$, and sends it to Alice.

Step 9: After receiving the matrix $B_1$ from Bob and $t_2$: from Carol, Alice internally generates a random matrix of $V_a \in R^{n \times m}$ secretly, computes locally $t_1=R_aB_1$, $S_b=t_1 \cdot t_2=R_aB_1 \cdot B_2R_c=R_a\hat{B}R_c$ and $T_a=M_a+S_a-V_a-r_a+S_b$, and sends $T_a$ to Bob.

Step 10: After receiving the matrix $T_a$ sent from the Alice node, the Bob node internally generates a random matrix $V_b \in R^{n \times m}$ secretly, secretly computes a matrix $M_b=\hat{A} \cdot R_b \cdot \hat{C}$ locally, and finally obtains $T_b=T_a-M_b-V_b-r_b$ which is sent to Carol.

Step 11: After receiving the matrix $T_b$ sent from Bob, Carol secretly computes the matrix $V_c=T_b-M_c+S_c-r_c$ locally.

Step 12 and step 13 in this embodiment are the same as step 12 and step 13 in Embodiment 4.

Step 14: The Alice node secretly computes $C_a=M_a+S_a-V_a+S_b$ locally according to private computation intermediate term matrixes $M_a$, $S_a$, $V_a$ and $S_b$ held by the Alice node, and sends a self-checking matrix $C_a$ to the computation requestor.

Step 15: The Bob node secretly computes $C_b=-M_b-V_b$ locally according to private computation intermediate term matrixes $M_b$ and $V_b$ held by the Bob node, and sends a self-checking matrix $C_b$ to the computation requestor.

Step 16: The Carol node secretly computes $C_c=-M_c+S_c-V_c$ locally according to private computation intermediate term matrixes $M_c$, $S_c$, $V_c$ held by the Carol node, and sends a self-checking matrix $C_c$ to the computation requestor.

Step 17 in this embodiment is the same as step 17 in Embodiment 4.

Embodiment 6: This embodiment differs from the foregoing Embodiment 1. After computing a matrix $\varphi_1$, a matrix $\gamma_1$, a matrix $\varphi_2$ and a matrix $\gamma_2$, the embodiment of the present disclosure performs a first scheme or a second scheme. In the first scheme, the matrix $\gamma_1$ and the matrix $\varphi_1$ are sent to a third participant, and the matrix $\hat{B}$, the matrix $\gamma_2$ and the matrix $\varphi_2$ are sent to a first participant. In the second scheme, the matrix $\hat{B}$, the matrix $\gamma_1$ and the matrix $\varphi_1$ are sent to a third participant, and the matrix $\gamma_2$ and the matrix $\varphi_2$ are sent to the first participant. The matrix $\hat{A}$ is obtained by computing a sum of a random matrix $R_a$ and a private matrix A of the first participant by the first participant, and the matrix $\hat{C}$ is obtained by computing a sum of a random matrix $R_c$ and a private matrix C of the third participant by the third participant. The first participant randomly generates a secret random matrix $V_a$. If the second participant performs the first scheme, the first participant computes a matrix $T_a$ according to the matrix $\varphi_2$, the private matrix A of the first participant, the matrix $\gamma_2$, the random matrix $R_a$, the secret random matrix $V_a$ and a random matrix $r_a$, computes a matrix t according to the random matrix $R_a$ and the matrix $\hat{B}$, sends the matrix $T_a$ to the second participant, sends the matrix t to the third participant, and sends the secret random matrix $V_a$ to a three-party matrix multiplication computation requestor. If the second participant performs the second scheme, the first participant computes the matrix $T_a$ according to the matrix $\varphi_2$, the private matrix A of the first participant, the matrix $\gamma_2$, the random matrix $R_a$, the secret random matrix $V_a$, the random matrix $r_a$ and the matrix t, sends the matrix $T_a$ to the second participant, and sends the secret random matrix $V_a$ to the three-party matrix multiplication computation requestor. The matrix t is obtained by computing by the third participant according to the random matrix $R_c$ and the matrix $\hat{B}$. The second participant randomly generates a secret random matrix $V_b$, obtains a matrix $T_b$ according to the matrix $T_a$, the matrix $\hat{A}$, a random matrix $R_b$, the matrix $\hat{C}$, the secret random matrix $V_b$ and a random matrix $r_b$, sends the matrix $T_b$ to the third participant, and sends the secret random matrix $V_b$ to the three-party matrix multiplication computation requestor. If the second participant performs the first scheme, the third participant obtains a secret random matrix $V_c$ according to the matrix $T_b$, the matrix t, a random matrix $R_c$, the matrix $\varphi_1$, the matrix and a random matrix $r_c$, and sends the secret random matrix $V_c$ to the three-party matrix multiplication computation requestor; and if the second participant performs the second scheme, the third participant obtains the secret random matrix $V_c$ according to the matrix $T_b$, the random matrix $R_c$, the matrix $\varphi_1$, the matrix $\gamma_1$ and the random matrix $r_c$, and sends the secret random matrix $V_c$ to the three-party matrix multiplication computation requestor. The three-party matrix multiplication computation requestor obtains a product matrix ABC according to the secret random matrix $V_a$, the secret random matrix $V_b$ and the secret random matrix $V_c$. If the second participant performs the first scheme, the first participant obtains $C_a$ according to $\varphi_2$, A, $\gamma_2$, $R_a$ and $V_a$; the second participant obtains $C_b$ according to $\hat{A}$, $R_b$, $\hat{C}$ and $V_b$; and the third participant obtains $C_c$ according to $\varphi_1$, $\gamma_1$, t, $R_c$, and $V_c$. If the second participant performs the second scheme, the first participant obtains $C_a$ according to $\varphi_2$, A, $\gamma_2$, $R_a$, t and $V_a$; the second participant obtains $C_b$ according to $\hat{A}$, $R_b$, $\hat{C}$ and $V_b$; and the third participant obtains $C_c$ according to $\varphi_1$, $R_c$, $\gamma_1$ and $V_a$.

Figure 6:
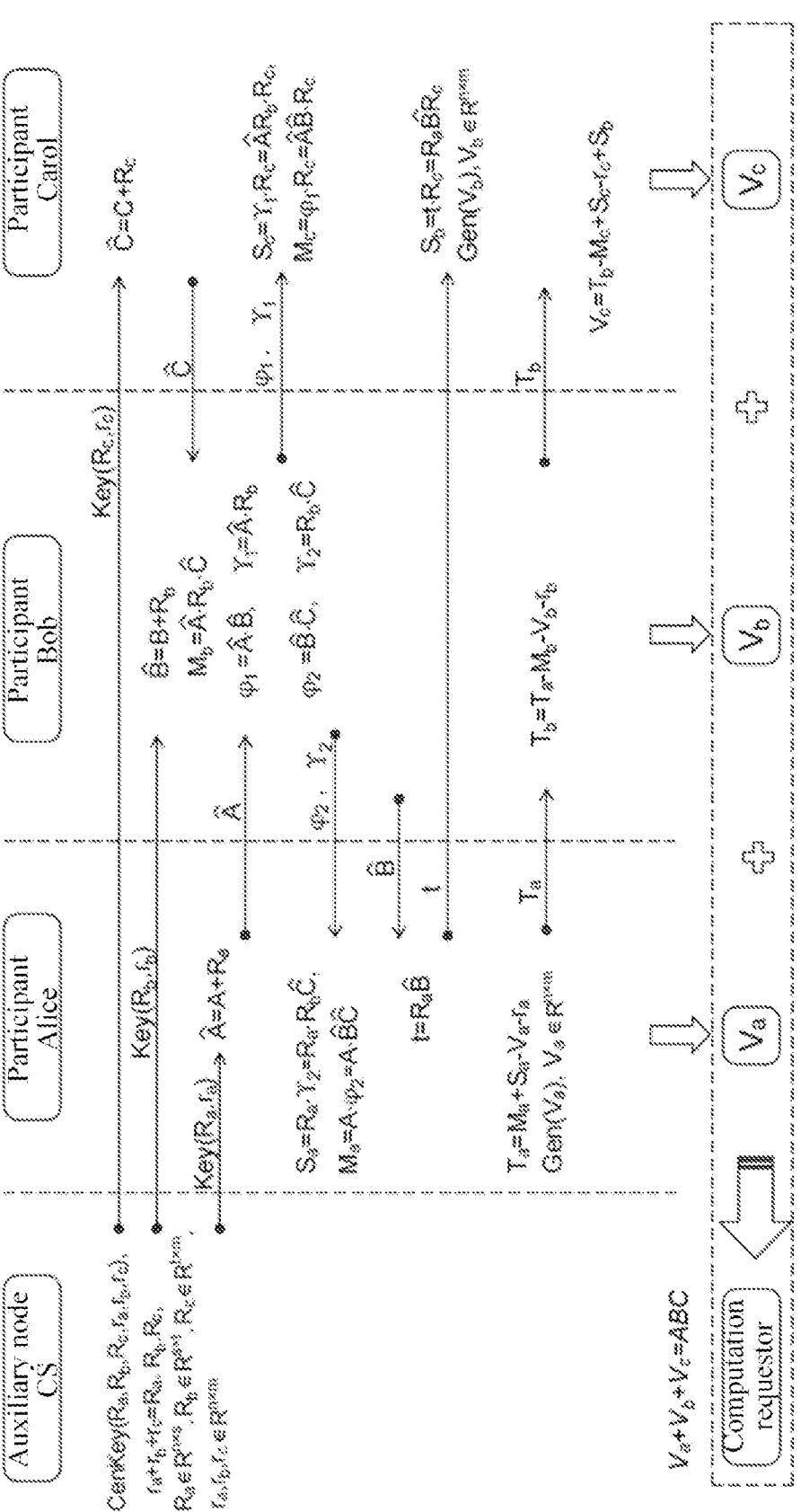
FIG. 6 is a flowchart of a scheme according to Embodiment 7 of the present disclosure.

Embodiment 7: As shown in FIG. 6, the present disclosure further provides a more specific embodiment for describing Embodiment 6 in detail:

Steps 1 to 6 in this embodiment are the same as steps 1 to 6 in Embodiment 2.

Step 7: Bob sends the matrix $\hat{B}$ to Alice.

Step 8: After receiving the matrix $\hat{B}$ from Bob, Alice internally generates a random matrix of $V_a \in R^{n \times m}$ secretly, computes locally $T_a=M_a+S_a-V_a-r_a$ and $t=R_a\hat{B}$, sends $T_a$ to Bob, and sends t to Carol.

Step 9: After receiving the matrix t from Alice, Carol secretly computes $S_b=t \cdot R_c=R_a\hat{B}R_c$.

Step 10: After receiving the matrix $T_a$ sent from Alice, Bob internally generates a random matrix $V_b \in R^{n \times m}$ secretly, secretly computes a matrix $M_b = \hat{A} \cdot R_b \cdot \hat{C}$ locally, and finally obtains $T_b = T_a - M_b - V_b - r_b$ which is sent to Carol.

Step 11: After receiving the matrix $T_b$ sent from Bob, Carol secretly computes the matrix $V_c = T_b + S_b - M_c + S_c - r_c$ locally.

Step 12 to step 17 in this embodiment are the same as step 12 to step 17 in Embodiment 4.

Embodiment 8: The present disclosure further provides a more specific embodiment for describing Embodiment 6 in detail:

Steps 1 to 6 in this embodiment are the same as steps 1 to 6 in Embodiment 7.

Step 7: Bob sends the matrix $\hat{B}$ to Carol.

Step 8: After receiving the matrix $\hat{B}$ from Bob, Carol computes $t = \hat{B} R_c$, and sends t to Alice.

Step 9: After receiving the matrix t from Carol, Alice internally generates a random matrix of $V_a \in R^{n \times m}$ secretly, computes locally $S_b = R_a \cdot t = R_a \hat{B} R_c$ and $T_a = M_a + S_a - V_a - r_a + S_b$, and sends $T_a$ to Bob.

Step 10: After receiving the matrix $T_a$ sent from Alice, Bob internally generates a random matrix $V_b \in R^{n \times m}$ secretly, secretly computes a matrix $M_b = \hat{A} \cdot R_b \cdot \hat{C}$ locally, and finally obtains $T_b = T_a - M_b - V_b - r_b$ which is sent to Carol.

Step 11: After receiving the matrix $T_b$ sent from Bob, Carol secretly computes the matrix $V_c = T_b - M_c + S_c - r_c$ locally.

Step 12 to step 17 in this embodiment are the same as step 12 to step 17 in Embodiment 5.

The present disclosure further provides a secure three-party multiplication system for privacy computing for Embodiment 1, including:

a random matrix pair generation module, used for an auxiliary compute node to: generate three groups of random matrix pairs randomly $(R_a, r_a)$ $(R_b, r_b)$ and $(R_c, r_c)$, send the random matrix pair $(R_a, r_a)$ to a first participant, send the random matrix pair $(R_b, r_b)$ to a second participant, and send the random matrix pair $(R_c, r_c)$ to a third participant, where $r_a + r_b + r_c = R_a \cdot R_b \cdot R_c$;

a determining module, used for the second participant to compute a sum of a random matrix $R_b$ and a private matrix B of the second participant to obtain a matrix $\hat{B}$, and determine whether the matrix $\hat{B}$ is a non-full rank matrix to obtain a first determining result;

a first result module, configured to perform the random matrix pair generation module if the first determining result is no;

a second result module, configured to: if the first determining result is yes, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, send the matrix $\gamma_1$ and the matrix $\varphi_1$ to the third participant, and send the matrix $\gamma_2$ and the matrix $\varphi_2$ to the first participant; where the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant;

a decomposition module, used for the second participant to: decompose the matrix $\hat{B}$ through a manner of full rank decomposition to obtain a column full rank matrix $B_1$ and a row full rank matrix $B_2$, where ranks of the matrix $\hat{B}$, the column full rank matrix $B_1$, and the row full rank matrix $B_2$ are equal, send the column full rank matrix $B_1$ to the first participant, and send the row full rank matrix $B_2$ to the third participant;

a secret random matrix $V_a$ determining module, used for the first participant to: generate a secret random matrix $V_a$ randomly, compute a matrix $T_a$ according to the matrix $\varphi_2$, the private matrix A of the first participant, the matrix $\gamma_2$, the random matrix $R_a$, the secret random matrix $V_a$ and the random matrix $r_a$, compute a matrix $t_1$ according to the random matrix $R_a$ and the column full rank matrix $B_1$, send the matrix $T_a$ and the matrix $t_1$ to the second participant, and send the secret random matrix $V_a$ to a three-party matrix multiplication computation requestor;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_a$, the matrix $\hat{C}$, the matrix $t_1$, a matrix $t_2$, the secret random matrix $V_b$, and the random matrix $r_b$, send the matrix $T_b$ to the third participant, and send the secret random matrix $V_b$ to the three-party matrix multiplication computation requestor; where the matrix $t_2$ is obtained by computing by the third participant according to the row full rank matrix $B_2$ and the matrix $R_c$;

a secret random matrix $V_c$ determining module, used for the third participant to: obtain a secret random matrix $V_c$ according to the matrix $T_b$, the matrix $\varphi_1$, the matrix $\gamma_1$, the random matrix $R_c$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

The present disclosure further provides a secure three-party multiplication system for privacy computing for Embodiment 3, including:

a random matrix pair generation module, used for an auxiliary compute node to: generate three groups of random matrix pairs randomly $(R_a, r_a)$ $(R_b, r_b)$ and $(R_c, r_c)$ send the random matrix pair $(R_a, r_a)$ to a first participant, send the random matrix pair $(R_b, r_b)$ to a second participant, and send the random matrix pair $(R_c, r_c)$ to a third participant, where $r_a + r_b + r_c = R_a \cdot R_b \cdot R_c$;

a matrix set computation module, used for the second participant to: compute a sum of a random matrix $R_b$ and a private matrix B of the second participant to obtain a matrix $\hat{B}$, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, send the matrix $\gamma_1$ and the matrix $\varphi_1$ to the third participant, and send the matrix $\gamma_2$ and the matrix $\varphi_2$ to the first participant; where the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant the third participant;

a decomposition module, used for the second participant to: decompose the matrix $\hat{B}$ through a manner of full rank decomposition to obtain a column full rank matrix $B_1$ and a row full rank matrix $B_2$, where ranks of the matrix $\hat{B}$, the column full rank matrix $B_1$, and the row full rank matrix $B_2$ are equal, send the column full rank matrix $B_1$ to the first participant, and send the row full rank matrix $B_2$ to the third participant;

a secret random matrix $V_a$ determining module, used for the first participant to: generate a secret random matrix $V_a$ randomly, and perform scheme 1 or scheme 2; in the scheme 1, compute a matrix $T_a$ according to the matrix $\varphi_2$, the private matrix A of the first participant, the matrix $\gamma_2$, the random matrix $R_a$, the secret random matrix $V_a$, and the random matrix $r_a$, compute a matrix $t_1$ according to the random matrix $R_a$ and the column full rank matrix $B_1$, send the matrix $T_a$ to the second participant, send the matrix $t_1$ to the third participant, and send the secret random matrix $V_a$ to a three-party matrix multiplication computation requestor; in the scheme 2, compute a matrix $T_a$ according to the matrix $\varphi_2$, the private matrix A of the first participant, the matrix $\gamma_2$, the random matrix $R_a$, the secret random matrix $V_a$, the column full rank matrix $B_1$, a matrix $t_2$ and the random matrix $r_a$, send the matrix $T_a$ to the second participant, and send the secret random matrix $V_a$ to the three-party matrix multiplication computation requestor; where the matrix $t_2$ is obtained by computing by the third participant according to the row full rank matrix $B_2$ and the random matrix $R_c$;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_b$, the matrix $\hat{C}$, the secret random matrix $V_b$, and the random matrix $r_b$, send the matrix $T_b$ to the third participant, and send the secret random matrix $V_b$ to the three-party matrix multiplication computation requestor;

a secret random matrix $V_c$ determining module, if the first participant performs scheme 1, used for the third participant to: obtain a secret random matrix $V_c$ according to the matrix $T_b$, the matrix $t_1$, the row full rank matrix $B_2$, the random matrix $R_c$, the matrix $\varphi_1$, the matrix $\gamma_1$, and the random matrix $r_c$, and send the secret random matrix $V_c$ to the three-party matrix multiplication computation requestor; and if the first participant performs scheme 2, used for the third participant to obtain a secret random matrix $V_c$ according to the matrix $T_b$, the random matrix $R_c$, the matrix $\varphi_1$, the matrix $\gamma_1$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

The present disclosure further provides a secure three-party multiplication system for privacy computing for Embodiment 6, including:

a random matrix pair generation module, used for an auxiliary compute node to: generate three groups of random matrix pairs randomly $(R_a, r_a)$ $(R_b, r_b)$ and $(R_c, r_c)$, send the random matrix pair $(R_a, r_a)$ to a first participant, send the random matrix pair $(R_b, r_b)$ to a second participant, and send the random matrix pair $(R_c, r_c)$ to a third participant, where $r_a+r_b+r_c=R_a \cdot R_b \cdot R_c$.

a determining module, used for the second participant to compute a sum of a random matrix $R_b$ and a private matrix B of the second participant to obtain a matrix $\hat{B}$, and determine whether the matrix $\hat{B}$ is a non-full rank matrix to obtain a first determining result;

a first result module, configured to perform the random matrix pair generation module if the first determining result is no;

a second result module, configured to: if the first determining result is yes, compute a matrix $\varphi_1$ according to a matrix $\hat{A}$ and the matrix $\hat{B}$, compute a matrix $\gamma_1$ according to the matrix $\hat{A}$ and the random matrix $R_b$, compute a matrix $\varphi_2$ according to the matrix $\hat{B}$ and a matrix $\hat{C}$, compute a matrix $\gamma_2$ according to the random matrix $R_b$ and the matrix $\hat{C}$, and perform a first scheme or a second scheme; in the first scheme, send the matrix $\gamma_1$ and the matrix $\varphi_1$ to the third participant, and send the matrix $\hat{B}$, the matrix $\gamma_2$, and the matrix $\varphi_2$ to the first participant; and in the second scheme, send the matrix $\hat{B}$, the matrix $\gamma_1$, and the matrix $\varphi_1$ to the third participant, and send the matrix $\gamma_2$ and the matrix $\varphi_2$ to the first participant; where the matrix $\hat{A}$ is obtained by computing a sum of the random matrix $R_a$ and a private matrix A of the first participant by the first participant, and the matrix $\hat{C}$ is obtained by computing a sum of the random matrix $R_c$ and a private matrix C of the third participant by the third participant;

a secret random matrix $V_a$ determining module, used for the first participant to generate a secret random matrix $V_a$ randomly, where if the second participant performs the first scheme, the first participant computes a matrix $T_a$ according to the matrix $\varphi_2$, the private matrix A of the first participant, the matrix $\gamma_2$, the random matrix $R_a$, the secret random matrix $V_a$, and the random matrix $r_a$, computes a matrix t according to the random matrix $R_a$ and the matrix $\hat{B}$, sends the matrix $T_a$ to the second participant, sends the matrix t to the third participant, and sends the secret random matrix $V_a$ to a three-party matrix multiplication computation requestor; and if the second participant performs the second scheme, the first participant computes a matrix $T_a$ according to the matrix $\varphi_2$, the private matrix A of the first participant, the matrix $\gamma_2$, the random matrix $R_a$, the secret random matrix $V_a$, the random matrix $r_a$, and a matrix t, sends the matrix $T_a$ to the second participant, and sends the secret random matrix $V_a$ to the three-party matrix multiplication computation requestor; where the matrix t is obtained by computing by the third participant according to the random matrix $R_c$ and the matrix $\hat{B}$;

a secret random matrix $V_b$ determining module, used for the second participant to: generate a secret random matrix $V_b$ randomly, obtain a matrix $T_b$ according to the matrix $T_a$, the matrix $\hat{A}$, the random matrix $R_b$, the matrix $\hat{C}$, the secret random matrix $V_b$, and the random matrix $r_b$, send the matrix $T_b$ to the third participant, and send the secret random matrix $V_b$ to the three-party matrix multiplication computation requestor;

a secret random matrix $V_c$ determining module, if the second participant performs the first scheme, used for the third participant to: obtain a secret random matrix $V_c$ according to the matrix $T_b$, the matrix t, the random matrix $R_c$, the matrix $\varphi_1$, the matrix $\gamma_1$, and the random matrix $r_c$, and send the secret random matrix $V_c$ to the three-party matrix multiplication computation requestor; and if the second participant performs the second scheme, used for the third participant to: obtain a secret random matrix $V_c$ according to the matrix $T_b$, the random matrix $R_c$, the matrix $\varphi_1$, the matrix $\gamma_1$, and the random matrix $r_c$, and send the secret random matrix $V_c$ to the three-party matrix multiplication computation requestor; and a product matrix ABC computation module, used for the three-party matrix multiplication computation requestor to obtain a product matrix ABC according to the secret random matrix $V_a$, the secret random matrix $V_b$, and the secret random matrix $V_c$.

Figure 3:
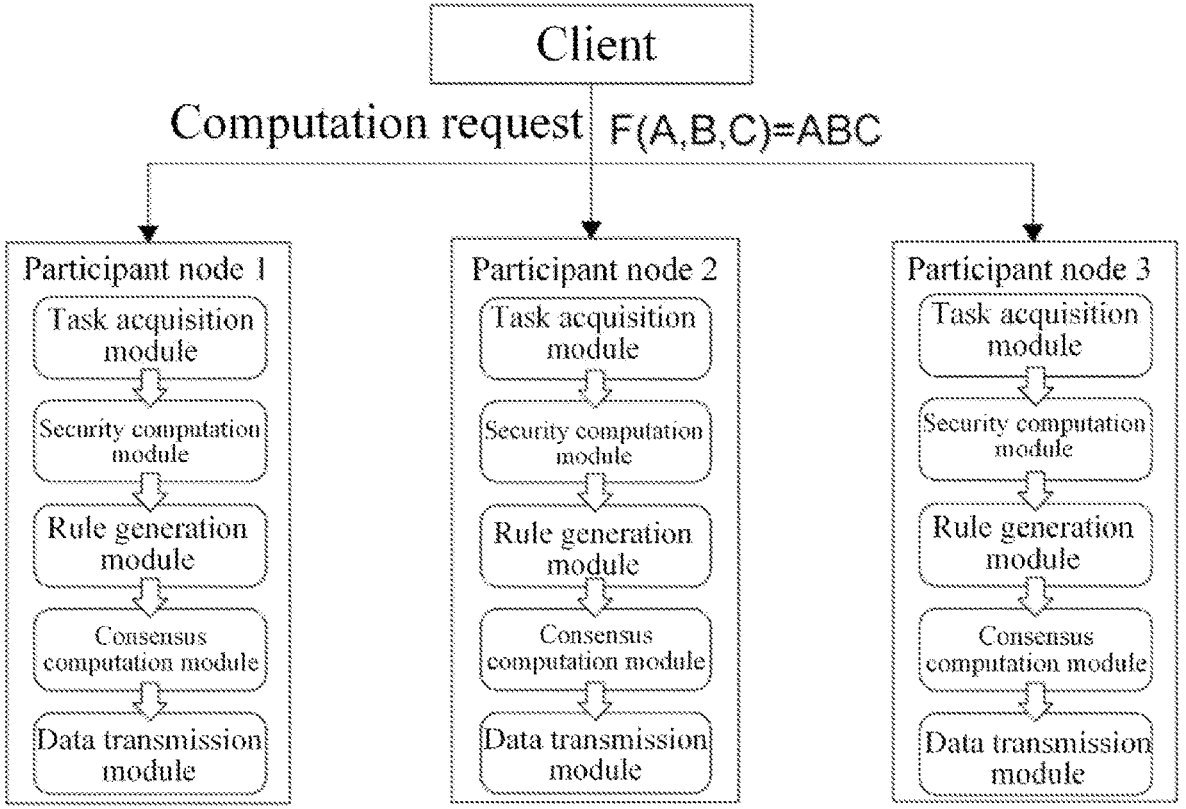
FIG. 3 is a schematic diagram of composition of a secure three-party matrix multiplication computation implementation apparatus according to an embodiment of the present disclosure.

An embodiment of the present disclosure further provides a secure three-party matrix multiplication computation implementation apparatus, as shown in FIG. 3. A process of implementation thereof is as follows:

Firstly, a corresponding distributed computing framework needs to be deployed at a computation participant node participating in a secure three-party computing task. The framework consists of five modules, including a task acquisition module, a security computation module, a rule generation module, a consensus computation module, and a data transmission module. The task acquisition module is responsible for receiving and decoding a privacy computing request from a client. The security computation module automatically matches a corresponding multi-party security computation protocol according to a parsed computation request. The rule generation module splits a computation task according to a asynchronous instruction set of the security computation protocol, and different computation nodes perform a cooperative computation according to respective self-rules. The consensus computation module, after receiving and being assigned to the sub-rules, ensures synchronization of the computation and consistency of a result through a consensus agreement. After completing a computation, the data transmission module collects and transmits computation results of participant nodes to a computation requestor. A specific implementation is as follows: An external client sends a request for a three-party matrix multiplication computation to a network terminal deployed with a distributed computation service through an HTTP or GRPC communication protocol. When a task acquisition module of a node on a network receives a request (Request) for a multiplication computation, the task acquisition module parses the request and starts a security computation service process for computing three participants. After the task acquisition module parses a corresponding computation requirement, the task acquisition module transmits a result to the security computation module, performs a joint query through an internal interface of the task acquisition module, and synchronizes the result to the rule generation module in the three participant nodes after matching the corresponding security computation protocol. The rule generation module makes different asynchronous parallel execution flows according to different subtasks assumed by three different participant nodes, and maintains communication with the consensus computation module at each step of execution. The consensus computation module broadcasts and maintains consistency of results of distributed computation nodes on a chain and controls stability of an execution flow while the three participant nodes perform each computation instruction. After a final computation protocol is performed, and the three participant nodes obtain computation sub-results of each other, the three participant nodes send, by using a data sending module, sub-matrixes after three-party obfuscation splitting to the computation requestor to obtain a correct computation result.

The present disclosure has the following technical effects:
1. Reliability of a computation result It can be readily verified that $$V_a + V_b + V_c = T_b - M_c + S_c - r_c + V_a + V_b$$

$$\Rightarrow V_a + V_b + V_c =$$

$$M_a + S_a - V_a - r_a - M_b + S_b - V_b - r_b - M_c + S_c - r_c + V_a + V_b$$

$$\Rightarrow V_a + V_b + V_c = (M_a - M_b - M_c) + (S_a + S_b + S_c) - (r_a + r_b + r_c)$$

$$\text{notice:} \begin{cases} M_a = A\hat{B}\hat{C}, & S_a = R_a R_b \hat{C} \\ M_b = \hat{A}R_b\hat{C}, & S_b = R_a \hat{B} R_c \\ M_c = \hat{A}\hat{B}R_c, & S_c = \hat{A}R_b R_c \end{cases}$$

$$\Rightarrow V_a + V_b + V_c = ABC - R_a R_b C - R_a B R_c -$$

$$A R_b R_c - 2R_a R_b R_c + R_a R_b \hat{C} + R_a \hat{B} R_c + \hat{A} R_b R_c - (r_a + r_b + r_c)$$

$$\Rightarrow V_a + V_b + V_c = ABC + 3R_a R_b R_c - 2R_a R_b R_c - R_a R_b R_c = ABC$$

The conventional multi-party security computation technology is mostly based on a semi-honest model, and its design target is to compute a demand result of a requestor. However, a hidden danger in which intermediate transmission data is lost, or communication transmission data is intercepted and data information is falsified by a malicious node caused by a communication factor is seldom considered in a computation process, which causes low reliability of a result. The present disclosure verifies of the reliability of a computation result by designing steps 13 to 17.

2. Ensure data privacy security of a secure multi-party multiplication computation Safety can be ensured by determining whether a matrix $\hat{B}$ is a non-full rank matrix or decomposing a matrix $\hat{B}$ in a manner of full rank decomposition.

3. Compared with a homomorphic encryption technology which requires a large quantity of matrix multiplication triples by invoking a two-party security protocol, inadvertent transmission, and secret sharing, causing huge communication overhead and computing overhead, the present disclosure greatly reduces computation communication traffic and communication rounds, and the introduction of CS greatly reduces computation overhead compared with the existing security matrix multiplication technology which needs to preprocess a large quantity of multiplication triples.

4. The present disclosure uses a matrix transformation type based on a random matrix obfuscation mode to compute $\hat{A}$, $\hat{B}$ and $\hat{C}$. Therefore, a matrix computation type involved is not limited to an integer. Compared with an obfuscation circuit scheme and a homomorphic encryption scheme which can only process a fixed-length decimal number and an integer type, the present disclosure enables the security matrix multiplication to have more application scenarios, and can improve reliability of result accuracy.

5. The present disclosure solves a bottleneck problem of inefficient parallelization of a computation process due to the fact that a two-party security matrix computation protocol is repeatedly invoked for a plurality of times when the existing research scheme relates to a secure three-party multiplication computation problem.

Each embodiment in the present disclosure is described in a progressive manner, each embodiment focuses on the difference from other embodiments, and the same and similar parts among the embodiments may refer to each other.

Since the system disclosed in an embodiment corresponds to the method disclosed in the embodiment, the description is relatively simple, and reference can be made to the method description.

Specific examples are used herein to explain principles and implementations of the present disclosure. The foregoing description of the embodiments is merely intended to help understand the method of the present disclosure and core ideas thereof. Besides, various modifications may be made by those of ordinary skill in the art to specific implementations and the application scope in accordance with the ideas of the present disclosure. In conclusion, the content of the present disclosure shall not be construed as limitations to the present disclosure.

What is claimed is:

1. A secure three-party multiplication method for privacy computing, which is implemented by a first participant node, a second participant node, and a third participant node as distributed computation nodes, wherein, each of the first participant node, the second participant node, and the third participant node is deployed with a distributed computing framework comprising a task acquisition module, a security computation module, a rule generation module, a consensus computation module, and a data transmission module, wherein the task acquisition module receives and parses a request for a three-party matrix multiplication computation from an external client as a three-party matrix multiplication computation requestor, and transmits the parsed request to the security computation module; the security computation module automatically matches a multi-party security computation protocol according to the parsed request; the rule generation module splits a computation task according to an asynchronous instruction set of the security computation protocol for the distributed computation nodes to perform a cooperative computation according to respective self-rules; the consensus computation module, after receiving and being assigned to the sub-rules, ensures synchronization of the computation and consistency of a result through a consensus agreement; and after completing a computation, the data transmission module collects and transmits computation results to the three-party matrix multiplication computation requestor;

wherein the secure three-party multiplication method for privacy computing comprises:

generating, by an auxiliary compute node, three groups of random matrix pairs randomly $(R_a, r_a)$ $(R_b, r_b)$ to the first, and $(R_c, r_c)$, sending the random matrix pair $(R_a, r_a)$ to the first participant node, sending the random matrix pair $(R_b, r_b)$ to the second participant node, and sending the random matrix pair $(R_c, r_c)$ to the third participant node, wherein $r_a+r_b+r_c=R_a \cdot R_b \cdot R_c$;

computing, by the second participant node, a sum of the random matrix $R_b$ and a private matrix B of the second participant node to obtain a matrix $\hat{B}$, and determining whether the matrix $\hat{B}$ is a non-full rank matrix to obtain a first determining result;

when the first determining result is no, returning to a step of generating, by the auxiliary compute node, three groups of random matrix pairs randomly, $(R_a, r_a)$ $(R_b, r_b)$ and $(R_c, r_c)$, sending the random matrix pair $(R_a, r_a)$ to the first participant node, sending the random matrix pair $(R_b, r_b)$ to the second participant node, and sending the random matrix pair $(R_c, r_c)$ to the third participant node;

when the first determining result is yes, computing a matrix $\varphi_1$ according to a matrix $\hat{A}$ and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, sending the matrix $\gamma_1$ and the matrix $\varphi_1$ to the third participant node, and sending the matrix $\gamma_2$ and the matrix $\varphi_2$ to the first participant node; wherein the matrix $\hat{A}$ is obtained by computing a sum of the random matrix $R_a$ and a private matrix A of the first participant node by the first participant node, and the matrix $\hat{C}$ is obtained by computing a sum of the random matrix $R_c$ and a private matrix C of the third participant node by the third participant node;

decomposing, by the second participant node, the matrix $\hat{B}$ through a manner of full rank decomposition to obtain a column full rank matrix $B_1$ and a row full rank matrix $B_2$, wherein ranks of the matrix $\hat{B}$, the column full rank matrix $B_1$, and the row full rank matrix $B_2$ are equal, sending the column full rank matrix $B_1$ to the first participant node, and sending the row full rank matrix $B_2$ to the third participant node;

generating, by the first participant node, a secret random matrix $V_a$ randomly, computing a matrix $T_a$ according to the matrix $\varphi_2$, the private matrix A of the first participant node, the matrix $\gamma_2$, the random matrix $R_a$, the secret random matrix $V_a$ and the random matrix $r_a$, computing a matrix $t_1$ according to the random matrix $R_a$ and the column full rank matrix $B_1$, sending the matrix $T_a$ and the matrix $t_1$ to the second participant node, and sending the secret random matrix $V_a$ to a three-party matrix multiplication computation requestor;

generating, by the second participant node, a secret random matrix $V_b$ randomly, obtaining a matrix $T_b$ according to the matrix $T_a$, the matrix $\hat{A}$, the random matrix $R_a$, the matrix $\hat{C}$, the matrix $t_1$, a matrix $t_2$, the secret random matrix $V_b$, and the random matrix $T_b$, sending the matrix $T_b$ to the third participant node, and sending the secret random matrix $V_b$ to the three-party matrix multiplication computation requestor; wherein the matrix $t_2$ is obtained by computing by the third participant node according to the row full rank matrix $B_2$ and the random matrix $R_c$;

obtaining, by the third participant node, a secret random matrix $V_c$ according to the matrix $T_b$, the matrix $\varphi_1$, the matrix $\gamma_1$, the random matrix $R_c$, and the random matrix $r_c$, and sending the secret random matrix $V_c$ to the three-party matrix multiplication computation requestor; and obtaining, by the three-party matrix multiplication computation requestor, a product matrix ABC according to the secret random matrix $V_a$, the secret random matrix $V_b$, and the secret random matrix $V_c$.

2. The secure three-party multiplication method for privacy computing according to claim 1, after the obtaining, by the three-party matrix multiplication computation requestor, a product matrix ABC according to the secret random matrix $V_a$, the secret random matrix $V_b$, and the secret random matrix $V_c$, further comprising:

determining, by the three-party matrix multiplication computation requestor, whether the product matrix ABC is reliable according to a self-checking matrix $C_a$, a self-checking matrix $C_b$, a self-checking matrix $C_c$ and a self-checking key Ckey, when the product matrix ABC is not reliable, returning to the step of generating, by the auxiliary compute node, three groups of random matrix pairs randomly $(R_a, r_a)$ $(R_b, r_b)$ and, $(R_c, r_c)$, sending the random matrix pair $(R_a, r_a)$ to the first participant node, sending the random matrix pair ($R_b$, $r_b$) to the second participant node, and sending the random matrix pair ($R_c$, $r_c$) to the third participant node, and when the product matrix ABC is reliable, ending computing; wherein the self-checking key Ckey is obtained by the auxiliary compute node according to the random matrix $r_a$, the random matrix $r_b$, and the random matrix $r_c$; the self-checking matrix $C_a$ is obtained by the first participant node according to the matrix $\varphi_2$, the private matrix A of the first participant node, the matrix $\gamma_2$ the random matrix $R_a$, and the secret random matrix $V_a$; the self-checking matrix $C_b$ is obtained by the second participant node according to the matrix $\hat{A}$, the random matrix $R_b$, the matrix $\hat{C}$, the matrix $t_1$, the matrix $t_2$, and the secret random matrix $V_b$; and the self-checking matrix $C_c$ is obtained by the third participant node according to the matrix $\varphi_1$, the random matrix $R_c$, the matrix $\gamma_1$, and the secret random matrix $V_c$.

3. A secure three-party multiplication method for privacy computing, which is implemented by a first participant node, a second participant node, and a third participant node as distributed computation nodes, wherein, each of the first participant node, the second participant node, and the third participant node is deployed with a distributed computing framework comprising a task acquisition module, a security computation module, a rule generation module, a consensus computation module, and a data transmission module, wherein the task acquisition module receives and parses a request for a three-party matrix multiplication computation from an external client as a three-party matrix multiplication computation requestor, and transmits the parsed request to the security computation module; the security computation module automatically matches a multi-party security computation protocol according to the parsed request; the rule generation module splits a computation task according to an asynchronous instruction set of the security computation protocol for the distributed computation nodes to perform a cooperative computation according to respective self-rules; the consensus computation module, after receiving and being assigned to the sub-rules, ensures synchronization of the computation and consistency of a result through a consensus agreement; and after completing a computation, the data transmission module collects and transmits computation results to the three-party matrix multiplication computation requestor;

wherein the secure three-party multiplication method for privacy computing comprises:

generating, by an auxiliary compute node, three groups of random matrix pairs randomly ($R_a$, $r_a$) ($R_b$, $r_b$) and ($R_c$, $r_c$), sending the random matrix pair ($R_a$, $r_a$) to the first participant node, sending the random matrix pair ($R_b$, $r_b$) to the second participant node, and sending the random matrix pair ($R_c$, $r_c$) to the third participant node, wherein $r_a + r_b + r_c = R_a \cdot R_b \cdot R_c$;

computing, by the second participant node, a sum of the random matrix $R_b$ and a private matrix B of the second participant node to obtain a matrix $\hat{B}$, computing a matrix $\varphi_1$ according to a matrix $\hat{A}$ and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, and sending the matrix $\gamma_1$ and the matrix $\varphi_1$ to the third participant node, and sending the matrix $\gamma_2$ and the matrix $\varphi_2$ to the first participant node; wherein the matrix $\hat{A}$ is obtained by computing a sum of the random matrix $R_a$ and a private matrix A of the first participant node by the first participant node, and the matrix $\hat{C}$ is obtained by computing a sum of the random matrix $R_c$ and a private matrix C of the third participant node by the third participant node;

decomposing, by the second participant node, the matrix $\hat{B}$ through a manner of full rank decomposition to obtain a column full rank matrix $B_1$ and a row full rank matrix $B_2$, wherein ranks of the matrix $\hat{B}$, the column full rank matrix $B_1$, and the row full rank matrix $B_2$ are equal, sending the column full rank matrix $B_1$ to the first participant node, and sending the row full rank matrix $B_2$ to the third participant node;

generating, by the first participant node, a secret random matrix randomly, and performing scheme 1 or scheme 2; wherein the scheme 1 comprises: computing a matrix $T_a$ according to the matrix $\varphi_2$, the private matrix A of the first participant node, the matrix $\gamma_2$, the random matrix $R_a$, the secret random matrix $V_a$, and the random matrix $r_a$, computing a matrix $t_1$ according to the random matrix $R_a$ and the column full rank matrix $B_1$, sending the matrix $T_a$ to the second participant node, sending the matrix $t_1$ to the third participant node, and sending the secret random matrix $V_a$ to a three-party matrix multiplication computation requestor; the scheme 2 comprises: computing a matrix $T_a$ according to the matrix $\varphi_2$, the private matrix A of the first participant node, the matrix $\gamma_2$, the random matrix $R_a$, the secret random matrix $V_a$, the column full rank matrix $B_1$, a matrix $t_2$ and the random matrix $r_a$, sending the matrix $T_a$ to the second participant node, and sending the secret random matrix $V_a$ to the three-party matrix multiplication computation requestor; wherein the matrix $t_2$ is obtained by computing by the third participant node according to the row full rank matrix $B_2$ and the random matrix $R_c$;

generating, by the second participant node, a secret random matrix $V_b$ randomly, obtaining a matrix $T_b$ according to the matrix $T_a$, the matrix $\hat{A}$, the random matrix $R_b$, the matrix $\hat{C}$, the sending the matrix $V_b$, and the random matrix $r_b$, secret random matrix $T_b$ to the third participant node, and sending the secret random matrix $V_b$ to the three-party matrix multiplication computation requestor;

when the first participant node performs the scheme 1, obtaining, by the third participant node, a secret random matrix $V_c$ according to the matrix $T_b$, the matrix $t_1$, the row full rank $B_2$ matrix, the random matrix $R_c$, the matrix $\varphi_1$, the matrix $\gamma_1$, and the random matrix $r_c$, and sending the secret random matrix $V_c$ to the three-party matrix multiplication computation requestor; when the first participant node performs the scheme 2, obtaining, by the third participant node, a secret random matrix $V_c$ according to the matrix $T_b$, the random matrix $R_c$, the matrix $\varphi_1$, the matrix $\gamma_1$, and the random matrix $r_c$, and sending the secret random matrix $V_c$ to the three-party matrix multiplication computation requestor; and obtaining, by the three-party matrix multiplication computation requestor, a product matrix ABC according to the secret random matrix $V_a$, the secret random matrix $V_b$, and the secret random matrix $V_c$.

4. The secure three-party multiplication method for privacy computing according to claim 3, after the obtaining, by the three-party matrix multiplication computation requestor, a product matrix ABC according to the secret random matrix $V_a$, the secret random matrix $V_b$, and the secret random matrix $V_c$, further comprising:

determining, by the three-party matrix multiplication computation requestor, whether the product matrix ABC is reliable according to a self-checking matrix $C_a$, a self-checking matrix $C_b$, a self-checking matrix $C_c$ and a self-checking key Ckey, when the product matrix ABC is not reliable, returning to a step of generating, by an auxiliary compute node, three groups of random matrix pairs randomly $(R_a, r_a)$ $(R_b, r_b)$ and $(R_c, r_c)$, sending the random matrix pair $(R_a, r_a)$ to the first participant node, sending the random matrix pair $(R_b, r_b)$ to the second participant node, and sending the random matrix pair $(R_c, r_c)$ to the third participant node, and when the product matrix ABC is reliable, ending computing; wherein the self-checking key Ckey is obtained by the auxiliary compute node according to the random matrix $r_a$, the random matrix $r_b$, and the random matrix $r_c$; when the first participant node performs the scheme 1, the self-checking matrix $C_a$ is obtained by the first participant node according to the matrix $\varphi_2$, the private matrix A of the first participant node, the matrix $\gamma_2$, the random matrix $R_b$, and the secret random matrix $V_a$; the self-checking matrix $C_b$ is obtained by the second participant node according to the matrix $\hat{A}$, the random matrix $R_a$, the matrix $\hat{C}$, and the secret random matrix $V_b$; the self-checking matrix $C_c$ is obtained by the third participant node according to the matrix $\varphi_1$, the random matrix $R_c$ the matrix $\gamma_1$, the matrix $t_1$, the row full rank matrix $B_2$, and the secret random matrix $V_c$; when the first participant node performs the scheme 2, the self-checking matrix $C_a$ is obtained by the first participant node according to the matrix $\varphi_2$, the private matrix A of the first participant node, the matrix $\gamma_2$, random matrix $R_b$, the secret random matrix $V_a$, the column full rank matrix $B_1$, the random matrix $R_a$, and the matrix $t_2$; the self-checking matrix $C_b$ is obtained by the second participant node according to the matrix $\hat{A}$, the random matrix $R_a$, the matrix $\hat{C}$, and the secret random matrix $V_b$; and the self-checking matrix $C_c$ is obtained by the third participant node according to the matrix, the random $\varphi_1$, the random matrix $R_c$, the matrix $\gamma_1$, and the secret random matrix $V_c$.

5. A secure three-party multiplication method for privacy computing, which is implemented by a first participant node, a second participant node, and a third participant node as distributed computation nodes, wherein, each of the first participant node, the second participant node, and the third participant node is deployed with a distributed computing framework comprising a task acquisition module, a security computation module, a rule generation module, a consensus computation module, and a data transmission module, wherein the task acquisition module receives and parses a request for a three-party matrix multiplication computation from an external client as a three-party matrix multiplication computation requestor, and transmits the parsed request to the security computation module; the security computation module automatically matches a multi-party security computation protocol according to the parsed request; the rule generation module splits a computation task according to an asynchronous instruction set of the security computation protocol for the distributed computation nodes to perform a cooperative computation according to respective self-rules; the consensus computation module, after receiving and being assigned to the sub-rules, ensures synchronization of the computation and consistency of a result through a consensus agreement; and after completing a computation, the data transmission module collects and transmits computation results to the three-party matrix multiplication computation requestor;

wherein the secure three-party multiplication method for privacy computing comprises:

generating, by an auxiliary compute node, three groups of random matrix pairs randomly $(R_a, r_a)$ $(R_b, r_b)$ and $(R_c, r_c)$, sending the random matrix pair $(R_a, r_a)$ to a first participant node, sending the random matrix pair $(R_b, r_b)$ to a second participant node, and sending the random matrix pair $(R_c, r_c)$ to a third participant node, wherein $r_a + r_b + r_c = R_a \cdot R_b \cdot R_c$;

computing, by the second participant node, a sum of the random matrix $R_b$ and a private matrix B of the second participant node to obtain a matrix $\hat{B}$, and determining whether the matrix $\hat{B}$ is a non-full rank matrix to obtain a first determining result;

when the first determining result is no, returning to a step of generating, by the auxiliary compute node, three groups of random matrix pairs randomly $(R_a, r_a)$ $(R_b, r_b)$ and $(R_c, r_c)$, sending the random matrix pair $(R_a, r_a)$ to the first participant node, sending the random matrix pair $(R_b, r_b)$ to the second participant node, and sending the random matrix pair $(R_c, r_c)$ to the third participant node;

when the first determining result is yes, computing a matrix $\varphi_1$ according to a matrix $\hat{A}$ and the matrix $\hat{B}$, computing a matrix $\gamma_1$ according to the matrix $\hat{A}$ and the random matrix $R_b$, computing a matrix $\varphi_2$ according to the matrix $\hat{B}$ and a matrix $\hat{C}$, computing a matrix $\gamma_2$ according to the random matrix $R_b$ and the matrix $\hat{C}$, and performing a first scheme or a second scheme; wherein the first scheme comprises: sending the matrix $\gamma_1$ and the matrix $\varphi_1$ to the third participant node, and sending the matrix $\hat{B}$, the matrix $\gamma_2$, and the matrix $\varphi_2$ to the first participant node; the second scheme comprises: sending the matrix $\hat{B}$, the matrix $\gamma_1$, and the matrix $\varphi_1$ to the third participant node, and sending the matrix $\gamma_2$ and the matrix $\varphi_2$ to the first participant node; the matrix $\hat{A}$ is obtained by computing a sum of the random matrix $R_a$ and a private matrix A of the first participant node by the first participant node, and the matrix $\hat{C}$ is obtained by computing a sum of the random matrix $R_c$ and a private matrix C of the third participant node by the third participant node;

generating, by the first participant node, a secret random matrix $V_a$ randomly, when the second participant node performs the first scheme, computing, by the first participant node, a matrix according to the matrix $\varphi_2$, the private matrix A of the first participant node, the matrix $\gamma_2$, the random matrix $R_a$, the secret random matrix $V_a$, and the random matrix $r_a$, computing a matrix t according to the random matrix $R_a$ and the matrix $\hat{B}$, sending the matrix $T_a$ to the second participant node, sending the matrix t to the third participant node, and sending the secret random matrix $V_a$ to a three-party matrix multiplication computation requestor; when the second participant node performs the second scheme, computing, by the first participant node, a matrix $T_a$ according to the matrix $\gamma_2$, the private matrix A of the first participant node, the matrix $\gamma_2$, the random matrix $R_a$, the secret random matrix $V_a$, the random matrix $r_a$, and the matrix t, sending the matrix $T_a$ to the second participant node, and sending the secret random matrix $V_a$ to the three-party matrix multiplication computation requestor; wherein the matrix t is obtained by computing by the third partici-
pant node according to the random matrix $R_c$ and the
matrix $\hat{B}$, generating, by the second participant node, a secret ran-
dom matrix $V_b$ randomly, obtaining a matrix $T_b$ accord-
ing to the matrix $T_a$ the matrix $\hat{A}$, the random matrix
$R_b$, the matrix $\hat{C}$, the secret random matrix $V_b$, and the
random matrix $r_b$, the sending matrix $T_b$ to the third
participant node, and sending the secret random matrix
$V_b$ to the three-party matrix multiplication computation
requestor;

when the second participant node performs the first
scheme, obtaining, by the third participant node, a
secret random matrix $V_c$ according to the matrix $T_b$, the
matrix t, the random, the matrix $R_c$, the matrix $\varphi_1$, the
matrix $\gamma_1$, and the random matrix $r_c$, and sending the
secret m matrix $R_c$, the matrix $\varphi_1$, the matrix $\gamma_1$, and the
random matrix $r_c$, and sending the secret random matrix
$V_c$ to the three-party matrix multiplication computation
requestor; when the second participant node performs
the second scheme, obtaining, by the third participant
node, a secret random matrix $V_c$ according to the matrix
$T_b$, the random matrix $R_c$, the matrix $\varphi_1$, the matrix $\gamma_1$,
and the random matrix $r_c$, and sending the secret
random matrix $V_c$ to the three-party matrix multiplica-
tion computation requestor; and obtaining, by the three-party matrix multiplication com-
putation requestor, a product matrix ABC according to
the secret random matrix $V_a$, the secret random matrix
$V_b$, and the secret random matrix $V_c$.

6. The secure three-party multiplication method for pri-
vacy computing according to claim 5, after the obtaining, by
the three-party matrix multiplication computation requestor,
a product matrix ABC according to the secret random matrix
$V_a$, the secret random matrix $V_b$, and the secret random
matrix Ve, further comprising:

determining, by the three-party matrix multiplication
computation requestor, whether the product matrix
ABC is reliable according to a self-checking matrix $C_a$, a self-checking matrix $C_b$, a self-checking matrix $C_c$
and a self-checking key Ckey, when the product matrix
ABC is not reliable, returning to the step of generating,
by an auxiliary compute node, three groups of random
matrix pairs randomly $(R_a, r_a)$ $(R_b, r_b)$ and $(R_c, r_c)$,
sending the random matrix pair A $(R_a, r_a)$ to the first
participant node, sending the random matrix pair $(R_b,
r_b)$ to the second participant node, and sending the
random matrix pair $(R_c, r_c)$ to the third participant node,
and when the product matrix ABC is reliable, ending
computing; wherein the self-checking key Ckey is
obtained by the auxiliary compute node according to
the random matrix $r_a$, the random matrix $r_b$, and the
random matrix $r_c$; when the second participant node
performs the first scheme, the self-checking matrix $C_a$
a is obtained by the first participant node according to
the matrix $\varphi_2$, the private matrix A of the first partici-
pant node, the matrix $\gamma_2$, the random matrix $R_a$, a and
the secret random matrix $V_a$; the self-checking matrix
$C_b$ is obtained by the second participant node according
to the matrix $\hat{A}$, the random matrix $R_b$, the matrix $\hat{C}$,
and the secret random matrix $V_b$; and the self-checking
matrix $C_c$ is obtained by the third participant node
according to the matrix $\varphi_1$; the matrix $\gamma_1$, the matrix t,
the random matrix $R_c$, and the secret random matrix $V_c$;
when the second participant node performs the second
scheme, the self-checking matrix $C_a$ is obtained by the
first participant node according to the matrix $\varphi_2$, the
private matrix A of the first participant node, the matrix
$\gamma_2$, the random matrix $R_a$, the matrix t, and the secret
random matrix $V_a$; the self-checking matrix $C_b$ is
obtained by the second participant node according to
the matrix $\hat{A}$, the random matrix $R_b$, the matrix $\hat{C}$, and
the secret random matrix $V_b$; and the self-checking
matrix $C_c$ is obtained by the third participant node
according to the matrix $\varphi_1$, the random matrix $R_c$, the
matrix $\gamma_1$, and the secret random matrix $V_c$.

* * * * *